(12) United States Patent
Takimoto et al.

(10) Patent No.: US 9,765,224 B2
(45) Date of Patent: Sep. 19, 2017

(54) ANTI-FOGGING FILM-FORMING MATERIAL, COATING LIQUID FOR FORMING ANTI-FOGGING FILM, ANTI-FOGGING ARTICLE, AND METHODS FOR PRODUCING THESE

(71) Applicant: Central Glass Company, Limited, Ube-shi, Yamaguchi (JP)

(72) Inventors: Chiharu Takimoto, Tsu (JP); Toshihiro Hirano, Yokkaichi (JP); Toru Ashida, Matsusaka (JP); Nozomi Oonishi, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 551 days.

(21) Appl. No.: 14/385,065

(22) PCT Filed: Feb. 20, 2013

(86) PCT No.: PCT/JP2013/054179
§ 371 (c)(1),
(2) Date: Jan. 5, 2015

(87) PCT Pub. No.: WO2013/136932
PCT Pub. Date: Sep. 19, 2013

(65) Prior Publication Data
US 2015/0111043 A1   Apr. 23, 2015

(30) Foreign Application Priority Data

Mar. 13, 2012 (JP) .................................. 2012-055465
Oct. 24, 2012 (JP) .................................. 2012-234409
Nov. 15, 2012 (JP) .................................. 2012-251340
Feb. 5, 2013 (JP) .................................. 2013-020596

(51) Int. Cl.
| | | |
|---|---|---|
| B32B 27/38 | (2006.01) |
| C09D 5/16 | (2006.01) |
| C09D 5/00 | (2006.01) |
| C08F 220/54 | (2006.01) |
| C09D 163/00 | (2006.01) |
| C08G 59/42 | (2006.01) |
| C03C 17/00 | (2006.01) |
| C03C 17/32 | (2006.01) |
| C03C 17/34 | (2006.01) |
| C03C 23/00 | (2006.01) |
| C09D 133/24 | (2006.01) |
| C08F 220/32 | (2006.01) |

(52) U.S. Cl.
CPC .......... *C09D 5/1662* (2013.01); *C03C 17/007* (2013.01); *C03C 17/326* (2013.01); *C03C 17/34* (2013.01); *C03C 23/007* (2013.01); *C08F 220/54* (2013.01); *C08G 59/4261* (2013.01); *C09D 5/00* (2013.01); *C09D 133/24* (2013.01); *C09D 163/00* (2013.01); *C08F 2220/325* (2013.01); *Y10T 428/31511* (2015.04); *Y10T 428/31515* (2015.04)

(58) Field of Classification Search
None
See application file for complete search history.

(56) References Cited

U.S. PATENT DOCUMENTS 5,180,760 A  *  1/1993  Oshibe ................... C03C 17/32
                                                            523/169

FOREIGN PATENT DOCUMENTS

| JP | 62-129367 A | 6/1987 |
| JP | 6-41519 A | 2/1994 |
| JP | 7-207192 A | 8/1995 |
| JP | 8-10697 A | 1/1996 |
| JP | 2003-105255 A | 4/2003 |
| JP | 2004-263008 A | 9/2004 |
| JP | 3778619 B2 | 5/2006 |
| JP | 2008-7677 A | 1/2008 |
| JP | 4862534 B2 | 1/2012 |
| WO | WO 2007/052710 A1 | 5/2007 |
| WO | WO2011090156 A1 * | 7/2011 |

OTHER PUBLICATIONS

Hirano, Toshihiro, WO2011/090156 A1 description—machine translation. Jul. 28, 2011.*
European Search Report issued in counterpart European Application No. 13760487.2 dated Jan. 14, 2016 (six pages).
International Search Report (PCT/ISA/210) dated Apr. 16, 2013, with English translation (Five (5) pages).
"X-ray reflectivity Introduction" edited by Kenji Sakurai, Kodansha Scientific, $2^{nd}$ impression of the first edition, pp. 3-5 (2009).
International Preliminary Report on Patentability (PCT/IB/373) dated Sep. 16, 2014, including Japanese-language Written Opinion (PCT/ISA/237) with English translation, dated Apr. 16, 2013 (nine (9) pages.

* cited by examiner

*Primary Examiner* — Coris Fung
(74) *Attorney, Agent, or Firm* — Crowell & Moring LLP

(57) ABSTRACT

Disclosed is an antifogging film-forming material obtained by reacting, in the presence of a quaternary ammonium salt or quaternary phosphonium salt, a copolymer represented by a certain general formula with a multifunctional epoxy compound having a solubility of 40-100 mass % in 25° C. water. The antifogging film-forming material is characterized by having a weight average molecular weight of 100,000-5,000,000. With this material, it becomes possible to obtain an antifogging article excellent in antifogging property, heat resistance, chemical resistance and abrasion resistance.

20 Claims, No Drawings

ANTI-FOGGING FILM-FORMING MATERIAL, COATING LIQUID FOR FORMING ANTI-FOGGING FILM, ANTI-FOGGING ARTICLE, AND METHODS FOR PRODUCING THESE

TECHNICAL FIELD

The present invention relates to: an antifogging film-forming material for forming an antifogging film that can greatly exhibit antifogging property, chemical resistance (e.g. acid resistance and alkali resistance), heat resistance and abrasion resistance in an antifogging window for use in vehicles, architectures and the like or in an antifogging article such as mirrors, lenses, displays and the like; a coating liquid for forming an antifogging film; an antifogging article; and methods for producing these.

BACKGROUND OF THE INVENTION

A transparent base material such as glass and plastic causes dew condensation at its surface due to the differences of temperature and humidity between the inner surface and the outer surface of the base material such that the water content in the atmosphere is adhered to the surface of the base material with its form changed into waterdrops, the differences being caused in the case where the temperature of either one of the surfaces falls below the dew point or in the case where an abrupt change of temperature and humidity occurs on the base material (e.g., in the case where the boiling steam is in contact with the base material, in the case where the base material is moved to a hot and humid environment from a cold portion, and the like). As a result of this, light scattering due to the condensed waterdrops, i.e. so-called "hazing" is caused, and so the visibility is impaired. With this "hazing", glasses for general use such as window glass, showcase glass, front glass for automotive vehicle or airplane, mirror, eyeglasses, sunglasses and the like are far reduced in safety and viewability.

As a method for imparting antifogging property to these base materials, there is a method of forming a coating film having hydrophilicity and water absorbing property. For example, in Patent Publication 1, there is disclosed a curable resin composition for antifogging coating, containing as essential components: (A) a carboxyl group-containing hydrophilic polymer having a number-average molecular weight of 5,000-20,000 composed of 50-100 wt % carboxyl group-containing unsaturated monomer and 0-50 wt % other copolymerizable hydrophilic unsaturated monomer; and (B) a hardener containing three or more epoxy groups in a molecule and having a water-dissolution ratio of not less than 50 (which is defined by multiplying an actually dissolved parts by weight when dissolving 10 parts by weight of the hardener in 100 parts by weight of water at room temperature by 10). As examples of other copolymerizable hydrophilic unsaturated monomer, Patent Publication 1 cites ethylene glycol mono(meth)acrylate, diethylene glycol mono(meth)acrylate, propylene glycol mono(meth)acrylate, dipropylene glycol mono(meth)acrylate, triethylene glycol mono(meth)acrylate, tripropylene glycol mono(meth)acrylate, polyethylene glycol mono(meth)acrylate, polypropylene glycol mono(meth)acrylate and polyethylene-propylene glycol mono(meth)acrylate, methyletherification products of these and the like.

Additionally, Patent Publication 2 discloses an antifogging coating composition containing: (A) 40-70 parts by weight of copolymer consisting of 50-80 wt % alkylene structural unit having an amide bond at side chain and 20-50 wt % alkylene structural unit having —C(=O)—O—X (where X represents a hydroxyl group-containing organic group) at side chain; (B) 30-60 parts by weight of polymer or copolymer containing at least 20 wt % alkylene structural unit having —C(=O)—O—Y (where Y represents an epoxy group-containing organic group) at side chain (100 parts by weight of the total of (A) and (B) is the primary component); an epoxy group-containing organic silane compound and/or melamine skeleton-containing compound (as an accessory component) in an amount of 0.3-30 parts by weight relative to 100 parts by weight of the total of (A) and (B); and further a curing catalyst. As examples of a vinyl monomer that provides the alkylene structural unit having —C(=O)—O—X (where X represents a hydroxyl group-containing organic group) at side chain, there are cited hydroxyethylacrylate and methacrylate, 2-hydroxypropylacrylate and methacrylate, and polyethylene glycol methacrylate and acrylate.

Additionally, Patent Publication 3 discloses an antifogging agent containing a water-absorbing polymeric compound and a cross-linking agent and capable of being applied and cross-linked on target articles thereby preventing the target articles from the clouding due to moisture. As examples of the water-absorbing polymeric compound, there are cited an acrylic copolymer containing carboxylic acid or salts thereof, an olefinic copolymer containing primary amino groups or salts thereof, an olefinic copolymer containing secondary amino groups or salts thereof and the like. As the cross-linking agent, an epoxy cross-linking agent is cited.

Furthermore, there is set forth in Patent Publication 4 an antifogging article comprising a base material and a water absorbing crosslinked resin layer formed on the surface of the base material, the antifogging article being characterized in that the water absorbing crosslinked resin layer is a crosslinked resin of 45 mg/cm$^3$ or greater saturated water absorption. Additionally, it discloses that the crosslinked resin layer is formed by reacting a cross-linkable component and a curing agent.

REFERENCES ABOUT PRIOR ART

Patent Documents

Patent Publication 1: Japanese Patent Application Publication No. 62-129367
Patent Publication 2: Japanese Patent Application Publication No. H06-041519
Patent Publication 3: Japanese Patent Application Publication No. H07-207192
Patent Publication 4: International Application Publication No. 2007/52710 Pamphlet Non-Patent Documents Non-Patent Publication 1: "X-ray reflectivity Introduction" edited by Kenji Sakurai, Kodansha Scientific, 2$^{nd}$ impression, 2009

SUMMARY OF THE INVENTION

An antifogging article is required to maintain antifogging property and visibility for a long period of time and to have such an extent of durability as to endure practical use. However, it is extremely difficult for an antifogging film improved in antifogging performance to have all of sufficient antifogging property, heat resistance, chemical resistance and abrasion resistance. Concerning heat resistance in such a case as to use an antifogging article as a window material for a vehicle, the article is required not to cause a defection of appearance while maintaining a certain extent of antifogging property even under a long period of exposure to about 100° C. heat, because the window material and its surroundings may be heated to around 100° C. if exposed to direct summer sunlight for a long period of time. A coating film obtained from the curable resin composition for antifogging coating as disclosed in Patent Publication 1 bears a problem of causing an appearance defection when heated at around 100° C. A coating film obtained from the antifogging coating composition of Patent Publication 2 is sometimes insufficient in durability against chemicals such as acids. An article provided to have at its surface a coating of the antifogging agent as disclosed by Patent Publication 3 causes a problem of degradation of antifogging property and a problem of the inadequacy of abrasion resistance in practical use. The antifogging article of Patent Publication 4 bears a problem of the insufficiency of durability against chemicals such as acids.

In view of the above, an object of the present invention is to provide an antifogging material for obtaining an antifogging article excellent in antifogging property, heat resistance, chemical resistance and abrasion resistance, a coating liquid for forming an antifogging film, an antifogging article and a method for producing these.

The present invention is an antifogging film-forming material obtained by reacting, in the presence of a quaternary ammonium salt or quaternary phosphonium salt, a compound represented by the following general formula [1] with a multifunctional epoxy compound having a solubility of 40-100 mass % in 25° C. water, the antifogging film-forming material being characterized by having a weight average molecular weight of 100,000-5,000,000.

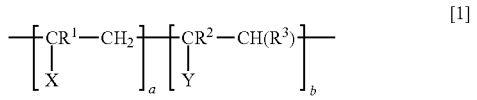

In the formula [1], $R^1$ and $R^2$ represent a hydrogen or a methyl group, and $R^3$ represents a hydrogen or a $C_1$-$C_5$ alkyl group. X represents: at least one group selected from the group consisting of —C(=O)—N($R^4$)$_2$ (where $R^4$ is mutually independently a $C_1$-$C_4$ alkyl group), an amino group, a sulfonate group and hydroxyl group; or a monovalent organic group comprising at least one group selected from the group consisting of an amide group, an amino group, a sulfonate group and hydroxyl group and an aliphatic hydrocarbon group. Y represents a carboxyl group or a group represented by —$R^5$—C(=O)—OH where $R^5$ is a divalent aliphatic hydrocarbon group or a divalent organic group comprising at least one group selected from the group consisting of an ester group, an ether group and an amide group and an aliphatic hydrocarbon group. "a" and "b" are integers at the ratio of a:b=0.7-2.5:1.0. Incidentally, the order of repeating structural units is not particularly limited.) In addition, "a" and "b" are integers with which the weight average molecular weight of the antifogging film-forming material falls within the above-mentioned range.

The solubility of the multifunctional epoxy compound in water is the ratio of a dissolved amount of a solute relative to the total amount of the solute which ratio is obtained by adding 10 parts by mass of the multifunctional epoxy compound as the solute to 90 parts by mass of 25° C. water as a solvent in order to try dissolution, the ratio being expressed by mass %.

The compound represented by the general formula [1] is preferably a compound represented by the following general formula [2].

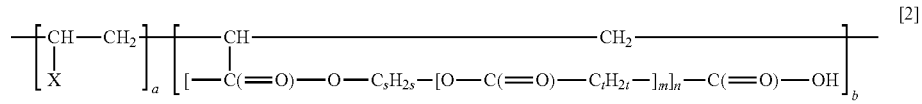

(In the formula [2], "X", "a" and "b" are the same as in the formula [1], "m" represents an integer of 0-2, "n" represents an integer of 0-3, "s" represents an integer of 1-4, and "t" represents an integer of 1-4. Incidentally, the order of repeating structural units is not particularly limited.)

Furthermore, it is preferable that the compound represented by the general formula [1] has a weight average molecular weight of 10,000-500,000.

Furthermore, it is preferable that the multifunctional epoxy compound is an aliphatic glycidyl ether-based polyepoxide or an aliphatic glycidyl ether-based epoxide.

Furthermore, it is preferable that the multifunctional epoxy compound has an average number of functional groups per molecule of 1.5-6.5.

Furthermore, it is preferable that the antifogging film-forming material is obtained, in the case where Y in the compound represented by the general formula [1] is a carboxyl group, by reacting the multifunctional epoxy compound in an amount of epoxy group of 1-2 mol relative to 1 mol of the carboxyl group.

Additionally, the present invention is a coating liquid for forming an antifogging film, comprising the above-mentioned antifogging film-forming material and a solvent.

Furthermore, it is preferable that the coating liquid for forming an antifogging film further comprises a curing agent.

In addition, the present invention is a method for preparing the above-mentioned coating liquid for forming an antifogging film, characterized in that the coating liquid is produced at least through the following steps:

a step of producing an antifogging film-forming material, where the compound represented by the general formula [1] is reacted, in the solvent and in the presence of a quaternary ammonium salt or quaternary phosphonium salt, with the multifunctional epoxy compound; and a step of preparing a coating liquid, where at least one operation selected from the group consisting of an operation for concentrating a solution containing the obtained antifogging film-forming material or adding a solvent to the solution thereby adjusting the solid matter concentration and the viscosity, an operation for adding a curing agent to the solution containing the obtained antifogging film-forming material and an operation for adding fine particles to the solution containing the obtained antifogging film-forming material is conducted.

Moreover, the present invention is a compound represented by the general formula [1], for producing the above-mentioned antifogging film-forming material by being reacted, in the presence of a quaternary ammonium salt or quaternary phosphonium salt, with a multifunctional epoxy compound having a solubility of 40-100 mass % in 25° C. water.

Moreover, the present invention is a compound represented by the general formula [2], for producing the above-mentioned antifogging film-forming material by being reacted, in the presence of a quaternary ammonium salt or quaternary phosphonium salt, with a multifunctional epoxy compound having a solubility of 40-100 mass % in 25° C. water.

Additionally, the present invention is an antifogging article comprising a base material, a primer layer formed on the surface thereof, and an antifogging film formed on the surface of the primer layer, characterized in that the antifogging film is obtained by applying and curing the above-mentioned coating liquid for forming an antifogging film.

Furthermore, it is preferable for the antifogging article that haze values of the antifogging article, measured before and after carrying out an abrasion resistance test according to JIS R 3212 at a portion where the test is conducted, have a difference of not larger than 4.0.

Furthermore, it is preferable for the antifogging article that an antifogging property reduction, which is a value expressed by $(A-B) \times 100/A$ where B is water absorption under water absorption saturation condition per unit area of an antifogging film after being exposed to 100° C. heat for 1000 hours and A is water absorption under water absorption saturation condition per unit area of an antifogging film before the exposure is 40% or less.

Furthermore, it is preferable for the antifogging article that the water absorption A is 0.2-5 mg/cm$^2$.

In addition, the present invention is a method for producing the above-mentioned antifogging article, characterized in that the antifogging article is produced at least through the following steps:

a step of forming a primer layer, where a primer layer comprising a silane coupling agent is formed on a surface of a base material;

a step of applying a coating liquid for forming an antifogging film, where a coating liquid for forming an antifogging film is applied onto the primer layer; and a curing step of curing a coating film obtained by the applying step.

Furthermore, it is preferable that the curing step is conducted by heating the coating film obtained after the applying step at not higher than 80° C. thereby curing it.

Furthermore, it is preferable that the method for producing the antifogging article further comprises a film-rinsing step of rinsing the surface of the antifogging film after the curing step.

Furthermore, it is preferable that the method for producing the antifogging article further comprises a step of forming an overcoat layer having a density of 0.50-0.85 g/cm$^2$ on the surface of the antifogging film after the curing step and before the film-rinsing step.

Furthermore, it is preferable that the antifogging article further comprises an overcoat layer having a density of 0.50-0.85 g/cm$^2$, on the surface of the antifogging film.

Furthermore, it is preferable that the overcoat layer comprises a reactant of polyacrylic acids having a weight average molecular weight of 2,000-150,000 and a multifunctional epoxy compound having a solubility of 40-100 mass % in 25° C. water.

Effects of the Invention

According to the present invention, it becomes possible to provide an antifogging material for obtaining an antifogging article excellent in antifogging property, heat resistance, chemical resistance and abrasion resistance, a coating liquid for forming an antifogging film, an antifogging article and a method for producing these. As a result, an antifogging article that maintains antifogging property and visibility of a transparent material for a long period of time while exhibiting such an extent of durability as to endure practical use, which has been unfeasible, becomes obtainable.

DETAILED DESCRIPTION

Hereinafter, the present invention will be discussed in detail.

1. Antifogging Film-Forming Material (1) About Compound Represented by General Formula [1]

A compound represented by general formula [1] is a copolymer that consists of a repeating structural unit having a group represented by X and a repeating structural unit having a group represented by Y (the compound represented by general formula [1] may hereinafter be referred to as merely "a copolymer"). The copolymer may be any of a random copolymer, a block copolymer and an alternating copolymer.

The copolymer may be obtained by copolymerizing monomers having a copolymerizable group or by copolymerizing oligomers having a copolymerizable group or by copolymerizing the monomer and the oligomer. Examples of a monomer that provides a repeating structural unit having a group represented by X can be cited by N,N-dimethyl (meth)acrylamide, N,N-diethyl (meth)acrylamide, N,N-di-n-propyl (meth)acrylamide, N,N-diisopropyl (meth)acrylamide, N,N-dibutyl (meth)acrylamide, dimethylaminoethyl (meth)acrylate, dimethylaminopropyl (meth)acrylate, diethylaminoethyl (meth)acrylate, diethylaminopropyl (meth)acrylate, dibutylaminoethyl (meth)acrylate, dibutylaminopropoyl (meth)acrylate, (meth)acryloyl morpholine, 1-(meth)acryloyl piperidin-2-one, 1-vinyl-2-pyrrolidone, 3-acryloyl-2-oxazolidinone, t-butyl N-allylcarbamate, N-(2-hydroxymethyl) (meth)acrylamide, N-(2-hydroxyethyl) (meth)acrylamide, N-methylolacrylamide, dimethylaminoethyl (meth)acrylamide, dimethylaminopropyl (meth)acrylamide, dimethylaminobutyl (meth)acrylamide, diethylaminoethyl (meth)acrylamide, diethylaminopropyl (meth)acrylamide, diethylaminobutyl (meth)acrylamide, dipropylaminoethyl (meth)acrylamide, dipropylaminopropyl (meth)acrylamide, dipropylaminobutyl (meth)acrylamide, dibutylaminoethyl (meth)acrylamide, dibutylaminoproypl (meth)acrylamide, dibutylaminobutyl (meth)acrylamide, 2-hydroxypropyl (meth)acrylate, 4-hydroxybutyl (meth)acrylate, 2-hydroxyethyl (meth)acrylate, t-butyl(meth)acrylamide sulfonic acid, vinyl sulfonic acid and the like. Meanwhile, examples of a monomer that provides a repeating structural unit having a group represented by Y can be cited by (meth)acrylic acid, mono(2-acryloyloxyethyl) succinate, 6-carboxyethyl (meth)acrylate, 3-butenoic acid, 4-pentenoic acid, trans-3-pentenoic acid, trans-2-pentenoic acid, 5-hexenoic acid, trans-3-hexenoic acid, 2-heptenoic acid, 3-heptenoic acid, 5-heptenoic acid, 6-heptenoic acid, 2-octenoic acid, trans-2-octenoic acid, 7-octenoic acid, 3-octenoic acid, 3-allyloxypropionic acid, N-tigloylglycine and the like. In the case of obtaining the copolymer by using an oligomer having a copolymerizable group, the oligomer is preferably one produced from a monomer having a copolymerizable group. The synthesis of copolymer is performed by usual polymerization.

In the copolymer, the group represented by X is a group which is to impart water-absorbing property (when an antifogging film is formed) to the film and contribute to the development of antifogging property. From the viewpoint of heat resistance, the group represented by X is preferably a group represented by —C(=O)—N($R^4$)$_2$ (where $R^4$ is mutually independently a $C_1$-$C_4$ alkyl group). Meanwhile, the group represented by Y in the copolymer is a group which is to form cross-links between itself and an epoxy group of the multifunctional epoxy compound and impart excellent heat resistance, chemical resistance and abrasion resistance to the film when an antifogging film is formed. From the viewpoint of compatibility and reactivity, the group represented by Y is preferably a group represented by [—C(=O)—O—$C_sH_{2s}$—{O—C(=O)—$C_tH_{2t}$—}$_m$]$_n$—C(=O)—OH (where "m" represents an integer of 0-2, "n" represents an integer of 0-3, "s" represents an integer of 1-4, and "t" represents an integer of 1-4). Of these, —C(=O)—OH, —C(=O)O$C_2H_4$C(=O)—OH and —C(=O)O$C_2H_4$OC(=O)$C_2H_4$C(=O)—OH are preferable, and more particularly, —C(=O)—OH is preferable from the viewpoint of chemical resistance.

In the copolymer, "a" and "b" in the general formula [1] show the abundance ratio between the repeating structural units having a group represented by X and the repeating structural units having a group represented by Y, the abundance ratio being represented by a:b=0.7-2.5:1.0. If a is less than 0.7 times as large as b (or in the case of a/b<0.7), neither a film which can maintain a sufficient antifogging property against heat nor a film having an adequate antifogging property is obtained. If a is more than 2.5 times as large as b (or in the case of 2.5<a/b), cross-links get decreased, and so acid resistance, alkali resistance and adhesiveness to the base material are reduced when an antifogging film is formed. In order to accomplish any of a practical antifogging property, acid resistance, alkali resistance and adhesiveness to the base material, the ratio a:b is more preferably 1.0-2.0:1.0.

It is preferable that the compound represented by the general formula [1] has a weight average molecular weight of 10,000-500,000. A weight average molecular weight of less than 10,000 tends to lower chemical resistance and therefore not preferable. Meanwhile, a weight average molecular weight of higher than 500,000 tends to so increase the viscosity of the coating liquid for forming an antifogging film as to degrade workability during the application operation, and therefore not preferable. The weight average molecular weight is more preferably 30,000 to 200,000.

(2) About Multifunctional Epoxy Compound

A multifunctional epoxy compound is a compound having an average number of functional groups per molecule (the average number of epoxy groups that exist in one molecule) of larger than 1. An epoxy group contained in the multifunctional epoxy compound is a group which is to form cross-links between itself and the group represented by Y of the compound represented by the general formula [1]. The multifunctional epoxy compound serves as a component that imparts, when an antifogging film is formed, excellent heat resistance, chemical resistance and abrasion resistance to the film. The multifunctional epoxy compound can favorably be reacted with the copolymer if it has an average number of functional groups per molecule of 1.5-6.5, which is preferable since abrasion resistance is greatly exhibited when an antifogging film is formed. More preferably, the average number of functional groups per molecule is 2 to 4.1. If the average number of functional groups is smaller than 1.5 when an antifogging film is formed, cross-links tend to get decreased thereby weakening the abrasion resistance of the antifogging film. Meanwhile, if the average number of functional groups is larger than 6.5, steric hindrance is to occur to increase unreacted groups when an antifogging film is formed, thereby degrading chemical resistance.

The multifunctional epoxy compound is provided to have a solubility of 40-100 mass % in 25° C. water. A solubility of lower than 40 mass % decreases compatibility and reactivity with the copolymer, so that it becomes difficult to form a uniform and clear film. In order to obtain excellent compatibility and reactivity, a multifunctional epoxy compound having a solubility of 80 mass % or higher is more preferable.

Examples of the multifunctional epoxy compound include sorbitol polyglycidyl ether (e.g. "DENACOLEX-614", "DENACOLEX-614B" and the like available from Nagase ChemteX Corporation), polyglycerol polyglycidyl ether (e.g. "DENACOLEX-512" and "DENACOLEX-521" available from Nagase ChemteX Corporation), pentaerythritol polyglycidyl ether, diglycerol polyglycidyl ether (e.g. "DENACOLEX-421" available from Nagase ChemteX Corporation and "SR-4GL" available from SAKAMOTO YAKUHIN KOGYO CO., LTD.), glycerol polyglycidyl ether (e.g. "DENACOLEX-313" and "DENACOLEX-314" available from Nagase ChemteX Corporation and "SR-GLG" available from SAKAMOTO YAKUHIN KOGYO CO., LTD.), (poly)ethylene glycol diglycidyl ether (e.g. "DENACOLEX-810", "DENACOLEX-811", "DENACOLEX-850", "DENACOLEX-851", "DENACOLEX-821", "DENACOLEX-830", "DENACOLEX-832", "DENACOLEX-841" and "DENACOLEX-861" available from Nagase ChemteX Corporation, and "SR-EGM", "SR-8EG" and "SR-BEGS" available from SAKAMOTO YAKUHIN KOGYO CO., LTD.), (poly)propylene glycol diglycidyl ether (e.g. "DENACOLEX-911", "DENACOLEX-941" and "DENACOLEX-920" available from Nagase ChemteX Corporation and "SR-PG" available from SAKAMOTO YAKUHIN KOGYO CO., LTD.), and the like. Of these, an aliphatic glycidyl ether-based polyepoxide or aliphatic glycidyl ether-based epoxide having particularly good compatibility with the above-mentioned copolymer is preferable, which is exemplified by glycerol polyglycidyl ether (e.g. "DENACOLEX-313" and "DENACOLEX-314" available from Nagase ChemteX Corporation and "SR-GLG" available from SAKAMOTO YAKUHIN KOGYO CO., LTD.), polyglycerol polyglycidyl ether (e.g. "DENACOLEX-512" and "DENACOLEX-521" available from Nagase ChemteX Corporation) and the like.

(3) About Production of Antifogging Film-Forming Material

An antifogging film-forming material according to the present invention is obtained by causing a cross-linking reaction between the compound represented by the general formula [1] and the multifunctional epoxy compound, in the presence of a quaternary ammonium salt or quaternary phosphonium salt (a step of producing an antifogging film-forming material). The quaternary ammonium salt or quaternary phosphonium salt is for accelerating the cross-linking reaction between a carboxyl group of the compound represented by the general formula [1] and an epoxy group of the multifunctional epoxy compound, and it may serve as a part of the antifogging film-forming material in itself.

Examples of the quaternary ammonium salt are benzyltriethylammonium chloride, cetyltrimethylammonium bromide, tetrabutylammonium bromide, benzyltrimethylammonium chloride, and the like. Further, examples of the quaternary phosphonium salt include tetrabutylphosphonium bromide, butyltriphenylphosphonium bromide, ethyltriphenylphosphonium bromide, methyltriphenylphosphonium bromide, tetraphenylphosphonium bromide, tetraphenylphosphonium tetraphenylborate, tetraphenylphosphonium tetra p-methylphenylborate, tetraphenylphosphonium thiocyanate, tetrabutylphosphonium decanoate and the like. Among them, ethyltriphenylphosphonium bromide, tetraphenylphosphonium bromide and the like, which are excellent in heat resistance and cross-linking reaction acceleration effect, are preferable.

The above-mentioned quaternary ammonium salt or quaternary phosphonium salt is preferably added in an amount of 0.1 to 2.0 mass % relative to the multifunctional epoxy compound. If the additive amount is less than 0.1 mass %, the cross-linking reaction acceleration effect tends to become little so that heat resistance, acid resistance and alkali resistance of the antifogging film may not sufficiently be obtained. On the other hand, an additive amount exceeding 2.0 mass % does not so improve the cross-linking reaction acceleration effect, rather not preferable in view of cost.

It is preferable that the antifogging film-forming material is obtained by a cross-linking reaction in such a manner that, in the case where Y in the compound represented by the general formula [1] is a carboxyl group, the amount of the epoxy groups of the multifunctional epoxy compound is 1-2 mol relative to 1 mol of the carboxyl group. When the epoxy group is in an amount of less than 1 mol relative to 1 mol of the carboxyl group, unreacted carboxyl groups remain in the obtained antifogging film to unfavorably develop a tendency to reduce alkali resistance of the antifogging film. Meanwhile, when the epoxy group is in an amount of more than 2 mol relative to 1 mol of the carboxyl group, the amount of a bonding moiety formed by a reaction between epoxy groups is so increased as to unfavorably develop a tendency to reduce acid resistance of the antifogging film. The antifogging film-forming material is more preferably obtained by a cross-linking reaction in such a manner that the amount of the epoxy groups is 1-1.7 mol relative to 1 mol of the carboxyl group.

A cross-linking reaction, which is performed in a step of producing an antifogging film-forming material between the compound represented by the general formula [1] and the multifunctional epoxy compound in the presence of a quaternary ammonium salt or quaternary phosphonium salt, is developed in a solvent. Examples of the solvent can be cited by water, methyl alcohol, ethyl alcohol, propyl alcohol, butanol, ethylene glycol, 1,2-propanediol, cyclohexanol, N,N-dimethylformamide, dimethyl sulfoxide and the like. From the viewpoint of compatibility and safety, ethyl alcohol is preferable. Additionally, it is also possible to use two or more solvents as a mixture solvent.

The antifogging film-forming material of the present invention has a weight average molecular weight of 100,000-5,000,000. If the weight average molecular weight is less than 100,000, acid resistance, alkali resistance and adhesiveness cannot be sufficiently obtained. On the other hand, in the case where the weight average molecular weight is more than 5,000,000, the antifogging film-forming material is not fully dissolved in the solvent so that a uniform coating liquid for forming an antifogging film becomes difficult to obtain. It is more preferable that the weight average molecular weight is 100,000-2,000,000.

Reaction conditions for initiating the cross-linking reaction in the presence of a quaternary ammonium salt or quaternary phosphonium salt between the compound represented by the general formula [1] and the multifunctional epoxy compound (or reaction conditions for a step of producing an antifogging film-forming material) are not particularly limited so long as the antifogging film-forming material having a weight average molecular weight of 100,000-5,000,000 is obtained; however, the reaction is preferably conducted at a temperature not lower than 50° C. and not higher than the boiling point of the solvent. Additionally, the reaction in a sealed vessel may be performed under an applied pressure, in which case the upper limit of the reaction temperature may be 20° C. higher the boiling point of the solvent. Furthermore, the reaction is preferably carried out under reflux so that the cross-linking reaction can easily and stably be developed and the weight average molecular weight of the obtained antifogging film-forming material can be controlled with ease.

2. Coating Liquid for Forming Antifogging Film

A coating liquid for forming an antifogging film, according to the present invention is produced through a step of preparing a coating liquid, in which step at least one operation selected from the group consisting of an operation for concentrating a solution containing the antifogging film-forming material obtained by the step of producing an antifogging film-forming material or adding a solvent to the solution thereby adjusting the solid matter concentration and the viscosity, an operation for adding a curing agent to the solution containing the obtained antifogging film-forming material and an operation for adding fine particles to the solution containing the obtained antifogging film-forming material is conducted.

The solvent contained in the coating liquid for forming an antifogging film may be the one having used in the step of producing an antifogging film-forming material, or may be a solvent further added for adjusting the solid matter concentration and the viscosity. The solvent is exemplified by the same kind of solvent as used in the step of producing an antifogging film-forming material.

By the above-mentioned liquid preparation step, there is obtained a coating liquid for forming an antifogging film which coating liquid has been adjusted in solid matter concentration and viscosity. The solid matter concentration of the coating liquid for forming an antifogging film is preferably 20 to 60 mass %. A solid matter concentration falling within the above-mentioned range makes it easy to control the film thickness of the antifogging film when the antifogging film is formed. Moreover, the viscosity of the coating liquid for forming an antifogging film (for example, which is measured by a method according to JIS Z 8803) is preferably 20-200 mPa·s at 25° C. If the viscosity falls within the above-mentioned range, a leveling property of the coating film is greatly exhibited during the undermentioned step of applying the coating liquid for forming an antifogging film, which results in an excellent film-forming property. By the way, the concentration operation which may be conducted in the liquid preparation step is exemplified by conventionally known methods such as heat concentration, vacuum concentration and the like.

A curing agent which may be added in the liquid preparation step is an agent for accelerating the reaction of epoxy group and for accelerating the curing of the coating film in the undermentioned curing step, and it may serve as a part of the antifogging film in itself. Examples of the curing agent can be cited by amine compounds, imidazole compounds and the like. It is also possible to add two or more kinds of curing agents. The most preferable curing agents are polyoxyalkylenetriamine (for example, available from MITSUI FINE CHEMICALS, Inc. under the trade name of "T403" etc.), polyoxyalkylenetridiamine (for example, available from MITSUI FINE CHEMICALS, Inc. under the trade name of "D230" etc.) and the like because the effect of accelerating the reactivity of epoxy group, heat resistance and film strength of the cured antifogging film are satisfactorily obtained thereby.

The coating liquid for forming an antifogging film according to the present invention may contain a component of a conventionally known surfactant, antioxidant, LTV absorber, photostabilizer, infrared absorber, flame retardant, hydrolysis inhibitor, antifungal agent, organic or inorganic fine particles such as oxide particles and the like, unless the object of the present invention is impaired. The above-mentioned component may be contained in the raw materials, i.e., in the compound represented by the general formula [1], the multifunctional epoxy compound or the quaternary ammonium salt or quaternary phosphonium salt, or may be added in the step of producing an antifogging film-forming material, or may be added in the liquid preparation step. However, in order not to affect the reaction, the component is preferably added in the liquid preparation step.

Particularly when the fine particle component such as organic or inorganic fine particles is contained, the fine particle component exists in the obtained antifogging film. With this, even if a liquid contaminant that adheres to a part of the surface of the antifogging film is in a state of having been absorbed and incorporated in the film, a film expansion of the part to which the liquid contaminant adheres is suppressed so that the difference of film thickness is difficult to occur between the part and a part to which the liquid contaminant does not adhere. As a result, the antifogging film comes to have a difficulty in bringing about visual distortion, which is preferable. The above-mentioned fine particles are preferably in a state of colloid uniformly dispersed in liquid, and exemplified by products of Nissan Chemical Industries, Ltd. such as "methanol silica sol", "MA-ST-MS", "IPA-ST", "IPA-ST-MS", "IPA-ST-L", "IPA-ST-ZL", "IPA-ST-UP", "EG-ST", "NPC-ST-30", "MEK-ST", "MEK-ST-MS", "MIBK-ST", "XBA-ST", "PMA-ST", "DMAC-ST", "ST-20", "ST-30", "ST-40", "ST-C", "ST-N", "ST-O", "ST-5", "ST-50", "ST-20L", "ST-OL", "ST-XS", "ST-XL", "ST-YL", "ST-ZL", "QAS-40", "LSS-35", "LSS-45", "ST-UP", "ST-OUP" and "ST-AK", products of ADEKA CORPORATION such as "AT-20", "AT-30", "AT-40", "AT-50", "AT-20N", "AT-20A", "AT-30A", "AT-20Q", "AT-300" and "AT-300S", products of FUSO CHEMICAL CO., LTD. such as "PL-1", "PL-3", "PL-70", "PL-20", "PL-1-PA" and "PL-1-MA" and the like. The average particle diameter of the fine particles, which is obtained by measuring a particle diameter according to BET method, is preferably 5-100 nm. An average particle diameter of less than 5 nm tends to reduce the film expansion-suppressing effect and therefore not preferable. An average particle diameter of more than 100 nm is to act as the main cause of light scattering so as to promote the hazing of the film, which is therefore not preferable. The average particle diameter is more preferably 10-80 nm. Additionally, the fine particles to be contained in the antifogging film is preferably contained such that the solid content thereof is 50 parts by mass or smaller relative to 100 parts by mass of the solid content of the antifogging film. Fine particles having a solid content exceeding 50 parts by mass is not preferable since the water absorption of the obtained antifogging film tends to be lowered. It is more preferable that the fine particles is contained such that the solid content thereof is 3-30 parts by mass relative to 100 parts by mass of the solid content of the antifogging film.

3. Antifogging Article

An antifogging article according to the present invention is an antifogging article having a base material, a primer layer formed on the surface thereof, and an antifogging film formed on the surface of the primer layer, and obtained at least through: a step of forming a primer layer, where a primer layer comprising a silane coupling agent is formed on a surface of a base material; a step of applying a coating liquid for forming an antifogging film, where a coating liquid for forming an antifogging film is applied onto the primer layer; and a curing step of curing a coating film obtained by the applying step.

Examples of the base material can be cited by those having optical transparency, light reflectivity and glossiness and significantly impaired by hazing in viewability, outward appearance and design.

A typical base material having optical transparency is exemplified by glass. Glass is plate glass used commonly for automotive vehicles, architectures, industrial glass and the like, the plate glass being obtainable by float glass process, duplex process, roll-out process or the like and not limited in manufacturing process. The kind of glass is exemplified by: various colored glasses such as clear, green and bronze; various functional glasses such as UV or IR cut glass and electromagnetic shielding glass; glass usable as fire-proof glass such as wire glass, low-expansion glass and zero-expansion glass; tempered glass and the like; multi-layered glass; laminated glass; and the like. In addition to the above-mentioned plate glasses, there can be cited resin film such as polyethylene terephthalate and resin plate such as polycarbonate, acrylic resin and the like, for example.

A typical base material having light reflectivity is exemplified by mirror, metal, a metal-plated article and the like.

A typical base material having glossiness is exemplified by metal, a metal-plated article, ceramics and the like.

The above-mentioned base materials can take various shapes, such as flat plate, bent plate and the like. The plate thickness is not particularly limited but preferably not smaller than 1.0 mm and not larger than 10 mm. For example, when used as a window material for a vehicle, the plate thickness is preferably not smaller than 1.0 mm and not larger than 5.0 mm.

Examples of a compound that forms the primer layer are silane coupling agents such as 3-glycidoxypropyltrimethoxysilane, 3-glycidoxypropyltriethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-mercaptopropyltrimethoxysilane and the like.

A method for applying the coating liquid for forming an antifogging film onto the primer layer (in the step of applying a coating liquid for forming an antifogging film) is exemplified by publically known methods such as dip coating, flow coating, spin coating, roller coating, spraying, nozzle coating, screen printing, flexography printing, human hand coating, inkjet printing and the like.

A method for curing a coating film in the curing step is exemplified by heat curing, light curing and the like. In the case of heat curing, the heating temperature is preferably 50-200° C. A heating temperature of lower than 50° C. is inferior in curing rate to unfavorably take a time for curing, and therefore not acceptable. On the other hand, a heating temperature of higher than 200° C. is also not preferable because material itself that constitutes the antifogging film is sometimes deteriorated. Additionally, in the case of heat curing, it is necessary to conduct the curing at a temperature lower than the heat-resistant temperature of the base material. Meanwhile, in the case of light curing, a typical radical polymerization initiator or cationic polymerization initiator is used as an additive for the coating liquid. A method of irradiation is not particularly limited and it is possible to employ a high-pressure mercury light, a xenon lamp or the like.

When the coating film is cured by heating in the curing step, it is more preferable to heat it at 50-80° C. Even in the case of using as a base material a laminate glass for vehicles, so long as the heating temperature is 80° C. or lower, an intermediate layer of the laminated glass causes neither deformation nor shrinkage due to heat.

Furthermore, a film-rinsing step where the surface of the antifogging film is rinsed after the curing step may be carried out. It is preferable to rinse the surface of the antifogging film after the curing step, because a component not relating to the formation of the antifogging film and a contaminant adhered to the surface of the antifogging film after the curing step are reduced so that the undermentioned water absorption under water absorption saturation condition per unit area of the antifogging film and the antifogging property against 35° C. steam are improved. Examples of a rinsing liquid to be used in the film-rinsing step are water, methyl alcohol, ethyl alcohol, propyl alcohol, butanol, ethylene glycol, 1,2-propanediol, cyclohexanol, N,N-dimethylformamide, dimethyl sulfoxide, acetone and the like. From the viewpoint of rinsing ability and safety, water is preferably employed. Additionally, a mixture solvent obtained from two or more solvents may be used as the rinsing liquid. A method for rinsing the surface of the antifogging film in the film-rinsing step is exemplified by ultrasonic cleaning, spray cleaning, shower cleaning, jet cleaning, immersion cleaning, bubbling cleaning, jet cleaning, quick dump rinsing, flushing, steam cleaning and the like. Of these, shower cleaning, flushing and immersion cleaning and the like are preferable because good workability is provided by them.

The antifogging film of the antifogging article according to the present invention preferably has a thickness of 5-100 μm. A thickness of less than 5 μm brings about a tendency not to impart a sufficient water absorbing property to the antifogging film, and therefore not preferable. On the other hand, a thickness exceeding 100 μm is also not preferable since the antifogging film comes to easily cause optical distortion and productivity is sometimes reduced.

The haze values of an antifogging article (which are measured before and after carrying out an abrasion resistance test according to JIS R 3212, at a portion where the test is conducted) preferably have a difference of not larger than 4.0. When the difference between the both haze values is not larger than 4.0, the antifogging article is made secure in terms of outward appearance and viewability and, by extension, it can be said that the antifogging film has an abrasion resistance enough for practical use. It is more preferable that the difference between the both haze values is not larger than 3.5.

An antifogging property reduction obtained after exposing the antifogging article of the present invention to 100° C. heat for 1000 hours is preferably 40% or less. The antifogging property reduction means a value (%) expressed by $(A-B) \times 100/A$ where B is water absorption under water absorption saturation condition per unit area of the antifogging film of the antifogging article after exposing the antifogging article to 100° C. heat for 1000 hours and A is water absorption under water absorption saturation condition per unit area of the antifogging film before exposing the antifogging article to 100° C. heat for 1000 hours. An antifogging property reduction of greater than 40% raises the possibility that moieties contributing to water absorbing property of the antifogging film were decomposed, or the possibility that an unreacted hydrophilic active group caused reaction so that the structure of the antifogging film was changed from that antecedent to heat exposure, with which it becomes difficult to maintain the quality of the antifogging film for a long period of time. The antifogging property reduction is more preferably not larger than 20%.

The antifogging film of the antifogging article of the present invention preferably has a water absorption (the above-mentioned water absorption "A") of 0.2-5 mg/cm$^2$ under water absorption saturation condition per unit area. When the water absorption falls within the above range, the antifogging film has an adequate water absorbing property so that the antifogging article can easily exhibit a sufficient antifogging property. Moreover, the antifogging film can easily exhibit an excellent abrasion resistance. The water absorption is more preferably 0.2-3 mg/cm$^2$.

The antifogging article according to the present invention may be formed with an overcoat layer on the antifogging film. By providing the overcoat layer, coloring is difficult to occur even if a contaminant such as orange juice and coffee is adhered thereto, and concurrently the abrasion resistance is improved. An overcoat layer formed on an antifogging film is discussed in International Application Publication No. WO 2011/004873. However, this overcoat layer is characterized by being configured mainly of fine particles (silica particles), and it has a high density (of not smaller than 1.0 g/cm$^2$) because of being composed of an inorganic material having a silica skeleton (incidentally, the method of measuring the density of the film will be discussed later). If applying this overcoat layer to the present invention, the antifogging property is reduced and the hazing on an obtained antifogging article is increased so that a problem of outward appearance is brought about. Thus the above-mentioned overcoat layer cannot be applied to the present invention. However, by providing an overcoat layer not containing fine particles and having a density of 0.50-0.85 g/cm$^2$ on the antifogging film, it was found possible to improve the resistance to contaminants without impairing the antifogging property and outward appearance. The overcoat layer is preferably at least one kind selected from the group consisting of generally employed resins such as melamine resin, guanamine resin, sulfonamide resin, urea resin, cyanate resin, urethane resin, polyuria, thiourethane resin, polyimide resin, epoxy resin, phenoxy resin, vinylester resin, oxetane resin, alkyd resin, phthalic resin, allyl resin, phenol resin, benzooxazine resin, acrylic resin, methacrylic resin, fluororesin, polycarbonate resin, polyester resin, polyether resin, polyvinyl acetal resin and polyamide resin. In view of adhesion to the antifogging film it is more preferable to use epoxy resin, much more preferably a reactant obtained between polyacrylic acids having a weight average molecular weight of 2,000-150,000 and the above-mentioned multifunctional epoxy compound having a solubility of 40-100 mass % in 25° C. water. Furthermore, the overcoat layer preferably has a film thickness of 10-1000 nm, more preferably 15-200 nm. Moreover, it is preferable to form the overcoat layer on the surface of the antifogging film after the curing step and before the film-rinsing step.

EXAMPLES

Hereinafter, the present invention will more specifically be explained with reference to Examples. Antifogging articles obtained by the present Examples and Comparative Examples (referred to as "samples") were subjected to quality evaluations according to methods as discussed below.

[Film Thickness of Antifogging Film]

The film thickness of an antifogging film formed on a base material was measured in use of a stylus type surface roughness measuring instrument (SURFCORDER ET-4000A available from Kosaka Laboratory Ltd.).

[Abrasion Resistance]

There was performed a test where an antifogging article was put on a turntable with the side of an antifogging film up and rotated 100 times at a constant speed while applying a load of 4.9 N to an abrasive wheel, according to JIS R 3212. Thereafter, the difference between a haze value of a portion on which the test was conducted and a haze value of a portion on which the test was not conducted was calculated. If the difference of the haze values is not larger than 4.0, the antifogging film is practically favorable in terms of abrasion resistance. Furthermore, it can be said that the smaller the difference of the haze values, the more satisfactory abrasion resistance is obtained.

[Antifogging Property Against 35° C. Steam]

A sample was fixed above a 35° C. saturated steam bath in such a manner that the side of the antifogging film faced the bath, followed by measuring the time that elapsed before haze generation. In this test if the time that elapsed before haze generation is not less than 30 seconds, it can be said that the antifogging property of the antifogging film of the sample is excellent and that the antifogging property is more improved with longer time.

[Heat Resistance]

A sample was retained inside a constant temperature bath kept at 100° C. for 1000 hours, followed by visually checking the presence of exterior malfunction. A sample found to have no malfunction was classified as acceptable in terms of outward appearance (indicated by "0" in Tables) while a sample found to have a malfunction was classified as unacceptable in terms of outward appearance (indicated by "x" in Tables). Incidentally, "exterior malfunction" means yellowing or generation of dotted unevenness on the surface of the film. Additionally the above-mentioned antifogging property reduction was also calculated. If the antifogging property reduction is 40% or less, the quality of the antifogging film against heat can readily and favorably be maintained for a long period of time. Additionally, it can be said that the smaller the antifogging property reduction is, the greater the heat resistance is.

[Water Absorption Under Water Absorption Saturation Condition Per Unit Area of an Antifogging Film]

An antifogging article after having been kept in a drying oven of 80° C. temperature for 2 hours was measured by mass (a). Then, its antifogging film was brought into contact with 35° C. saturated steam for 60 minutes so that all over the surface exposed to steam was hazed, and additionally brought into water absorption saturation condition. Thereafter, waterdrops were wiped off the surface of the antifogging film, followed by measuring the mass (b) of the antifogging article. A value obtained from the calculation formula "(b−a)/(area exposed to steam)" was determined as water absorption under water absorption saturation condition per unit area of the antifogging film. Incidentally, the value (a) corresponds to that in a condition where the antifogging film does not absorb water. If the water absorption per unit area falls within a range of 0.2-5 mg/cm$^2$, the antifogging article can easily exhibit a sufficient antifogging property and the antifogging film can easily exhibit an excellent abrasion resistance.

[Acid Resistance]

A 3 mass % $H_2SO_4$ aqueous solution was adhered to a surface of an antifogging film at 23° C. for 24 hours. A film that exhibited neither dissolution nor peeling was indicated by "O" in Tables, a film that partially exhibited peeling or exterior malfunction was indicated by "Δ" in Tables, and a film that exhibited peeling or exterior malfunction or dissolution all over the surface was indicated by "x" in Tables.

[Alkali Resistance]

A 1 mass % NaOH aqueous solution was adhered to a surface of an antifogging film at 23° C. for 24 hours. A film that exhibited neither dissolution nor peeling was indicated by "0" in Tables, a film that partially exhibited peeling or exterior malfunction was indicated by "A" in Tables, and a film that exhibited peeling or exterior malfunction or dissolution all over the surface was indicated by "x" in Tables.

[Adhesion]

A cross-cut test was carried out on an antifogging article. An article where the antifogging film exhibited no peeling was indicated by "O" in Tables, that partially exhibited peeling was indicated by "A" in Tables, and that exhibited peeling all over the surface was indicated by "x" in Tables.

[Contamination Resistance (Coloring Resistance)]

A commercially available orange juice (available from Kirin Beverage Company, Limited under the trade name of Tropicana 100% juice) was adhered to a surface of an antifogging film at 80° C. for 24 hours. The difference of color (ΔE) between an article before adhesion and an article that had been subjected to rinsing after adhesion was measured. Measurement of the color difference is performed by using a spectrophotometric type color difference meter (available from NIPPON DENSHOKU INDUSTRIES CO., LTD. under the trade name of NF333). Incidentally, the smaller the value AE is, the better it is.

Example 1

(Preparation of Base Material)

As a base material, a 3 mm thickness of 100 mm×100 mm float glass was used. A surface of the base material was polished by ceria fine particles and then subjected to brushing and drying.

(Formation of Primer Layer)

A primer liquid was prepared by adding 0.1 g of 0.5 N nitric acid to a mixture liquid of; 0.1 g of 3-glycidoxypropyltrimethoxysilane (hereinafter sometimes referred to as "GPTMS") as a compound forming a primer layer; and 50 g of ethanol (hereinafter sometimes referred to as "EtOH"). This primer liquid was applied onto the surface of the base material by spin coating and calcined at 100° C. for 30 minutes, thereby forming a primer layer on the base material.

(Step of Producing Antifogging Film-Forming Material)

First of all, a compound represented by the general formula [1] was synthesized. N,N-Diethyl acrylamide (hereinafter sometimes referred to as "DEAA") and acrylic acid (hereinafter sometimes referred to as "AA") were used as raw materials and reacted at a mole ratio represented by DEAA/AA=1.3/1.0 at 65° C. for 3 hours, thereby obtaining a copolymer (a compound represented by the general formula [1]) having a weight average molecular weight of 60,000. In the copolymer of Example 1, a group represented by X corresponds to a —C(=O)N(C$_2$H$_5$)$_2$ group while a group represented by Y corresponds to a carboxyl group. In the general formula [1], "a" and "b" show the abundance ratio between repeating structural units having a —C(=O)N(C$_2$H$_5$)$_2$ group and repeating structural units having a carboxyl group. The abundance ratio, which can be calculated from a mole ratio between the raw materials (i.e. between DEAA having a —C(=O)N(C$_2$H$_5$)$_2$ group and AA having a carboxyl group), was a:b=1.3:1.0. Subsequently, 0.41 g of polyglycerol polyglycidyl ether as a multifunctional epoxy compound (available from Nagase ChemteX Corporation under the trade name of "DENACOL EX-421", having a solubility of 88 mass % in 25° C. water and an average number of functional groups of 3.0), 0.0052 g of triphenylbutylphosphonium bromide (hereinafter sometimes referred to as "TPBPB") as a quaternary phosphonium salt, and 2.07 g of methanol as a solvent (hereinafter sometimes referred to as "MeOH") were added to 0.52 g of the copolymer and stirred in a sealed vessel bathed in 80° C. oil under reflux for 5 hours, thereby obtaining a solution where an antifogging film-forming material having a weight average molecular weight of 300,000 was contained. Incidentally, the multifunctional epoxy compound was added in such a manner that the amount of the epoxy group was 1.4 mol relative to 1 mol of the carboxyl group of the copolymer.

(Liquid Preparation Step)

The thus obtained solution that contained the antifogging film-forming material was diluted with the addition of methanol as a solvent, thereby preparing a coating liquid for forming an antifogging film. The obtained coating liquid for forming an antifogging film had a viscosity of 100 mPa·s at 25° C., the viscosity being obtained by a measurement method in compliance with JIS Z 8803.

(Step of Applying Coating Liquid for Forming Antifogging Film to Curing Step)

The coating liquid for forming an antifogging film was applied onto the primer layer of the base material by spin coating. The base material to which the coating liquid was applied was brought into an electric furnace kept at 80° C. for 16 hours, to cause curing. Thus an antifogging film was formed, thereby obtaining an antifogging article.

Conditions for producing the coating liquid for forming an antifogging film and the antifogging article are shown in Table 1. Furthermore, results of the quality evaluations on the obtained antifogging articles are shown in Table 2.

TABLE 1

| | Coating liquid for forming antifogging film Antifogging film-forming material | | | | | | | |
|---|---|---|---|---|---|---|---|---|
| | Compound represented by general formula [1] | | | | Multifunctional epoxy compound | | | Quaternary ammounium |
| | —X | —Y | a:b | Weight average molecular weight | Kind | Solubility in water [mass %] | Average number of functional groups | salt or quaternary phosphonium salt |
| Example 1 | —C(=O)N(C$_2$H$_5$)$_2$ | —COOH | 1.3:1 | 60,000 | EX-421 | 88 | 3 | TPBPB |
| Example 2 | —C(=O)N(CH$_3$)$_2$ | —COOH | 1.3:1 | 60,000 | EX-421 | 88 | 3 | TPBPB |
| Example 3 | —C(=O)N(C$_2$H$_5$)$_2$ | —C(=O)OC$_2$H$_4$COOH | 1.3:1 | 60,000 | EX-421 | 88 | 3 | TPBPB |
| Example 4 | —C(=O)N(CH$_3$)$_2$ | —C(=O)OC$_2$H$_4$O—C(=O)C$_2$H$_4$COOH | 1.3:1 | 60,000 | EX-421 | 88 | 3 | TPBPB |
| Example 5 | —C(=O)N(C$_2$H$_5$)$_2$ | —COOH | 2.0:1 | 60,000 | EX-421 | 88 | 3 | TPBPB |
| Example 6 | —C(=O)N(C$_2$H$_5$)$_2$ | —COOH | 1.3:1 | 100,000 | EX-421 | 88 | 3 | TPBPB |
| Example 7 | —C(=O)N(C$_2$H$_5$)$_2$ | —COOH | 1.3:1 | 60,000 | EX-313 | 99 | 2 | TPBPB |
| Example 8 | —C(=O)N(C$_2$H$_5$)$_2$ | —COOH | 1.3:1 | 60,000 | EX-421 | 88 | 3 | TPEPB |
| Example 9 | —C(=O)N(C$_2$H$_5$)$_2$ | —COOH | 1.3:1 | 60,000 | EX-421 | 88 | 3 | TPBPB |
| Example 10 | —C(=O)N(C$_2$H$_5$)$_2$ | —COOH | 1.3:1 | 60,000 | EX-421 | 88 | 3 | TPBPB |
| Example 11 | —C(=O)N(C$_2$H$_5$)$_2$ | —COOH | 1.3:1 | 60,000 | EX-421 | 88 | 3 | TPBPB |
| Example 12 | —C(=O)N(C$_2$H$_5$)$_2$ | —COOH | 1.3:1 | 60,000 | EX-421 | 88 | 3 | TPBPB |
| Example 13 | —C(=O)N(C$_2$H$_5$)$_2$ | —COOH | 1.3:1 | 60,000 | EX-421 | 88 | 3 | TPBPB |
| Example 14 | —C(=O)N(C$_2$H$_5$)$_2$ | —COOH | 1.3:1 | 60,000 | EX-421 | 88 | 3 | TPBPB |
| Example 15 | —C(=O)N(C$_2$H$_5$)$_2$ | —COOH | 1.3:1 | 60,000 | EX-421 | 88 | 3 | TPBPB |
| Comparative Example 1 | None | | | | EX-421 | 88 | 3 | TPBPB |
| Comparative Example 2 | —C(=O)N(C$_2$H$_5$)$_2$ | —COOH | 1.3:1 | 60,000 | None | | | TPBPB |
| Comparative Example 3 | —C(=O)N(C$_2$H$_5$)$_2$ | —COOH | 1.3:1 | 60,000 | EX-421 | 88 | 3 | None |

| | Coating liquid for forming antifogging film | | | | | | |
|---|---|---|---|---|---|---|---|
| | Antifogging film-forming material | | | | | | |
| | Molar amount of epoxy group relative to 1 mol of carboxyl group | Weight average molecular weight | Solvent | Curing agent | Temperature for curing step [° C.] | Compound for forming primer layer | Film-rinsing step |
| Example 1 | 1.4 | 300,000 | MeOH | None | 80 | GPTMS | None |
| Example 2 | 1.4 | 300,000 | MeOH | None | 80 | GPTMS | None |
| Example 3 | 1.4 | 300,000 | MeOH | None | 80 | GPTMS | None |
| Example 4 | 1.4 | 300,000 | MeOH | None | 80 | GPTMS | None |
| Example 5 | 1.4 | 300,000 | MeOH | None | 80 | GPTMS | None |

TABLE 1-continued

| | | | | | | | |
|---|---|---|---|---|---|---|---|
| Example 6 | 1.4 | 300,000 | MeOH | None | 80 | GPTMS | None |
| Example 7 | 1.4 | 300,000 | MeOH | None | 80 | GPTMS | None |
| Example 8 | 1.4 | 300,000 | MeOH | None | 80 | GPTMS | None |
| Example 9 | 1.6 | 300,000 | MeOH | None | 80 | GPTMS | None |
| Example 10 | 1.4 | 2,000,000 | MeOH | None | 80 | GPTMS | None |
| Example 11 | 1.4 | 300,000 | EtOH | None | 80 | GPTMS | None |
| Example 12 | 1.4 | 300,000 | MeOH | T403 | 80 | GPTMS | None |
| Example 13 | 1.4 | 300,000 | MeOH | None | 75 | GPTMS | None |
| Example 14 | 1.4 | 300,000 | MeOH | None | 135 | GPTMS | None |
| Example 15 | 1.4 | 300,000 | MeOH | None | 80 | APTES | None |
| Comparative Example 1 | 1.4 | 300,000 | MeOH | None | 80 | GPTMS | None |
| Comparative Example 2 | 1.4 | 300,000 | MeOH | None | 80 | GPTMS | None |
| Comparative Example 3 | 1.4 | 300,000 | MeOH | None | 80 | GPTMS | None |

TABLE 2

| | Film thickness [μm] | Difference of haze value between before and after abrasion resistance test | Antifogging property against 35° C. steam [sec] | Heat resistance Outward appearance | Heat resistance Antifogging property reduction [%] | Water absorption under water absorption saturation condition per unit area of antifogging film [mg/cm$^2$] | Acid resistance | Alkali resistance | Adhesion |
|---|---|---|---|---|---|---|---|---|---|
| Example 1 | 25 | 3.5 | 60 | ○ | 0 | 0.6 | ○ | ○ | ○ |
| Example 2 | 25 | 3.5 | 70 | ○ | 0 | 0.8 | ○ | ○ | ○ |
| Example 3 | 25 | 3 | 80 | ○ | 0 | 0.9 | Δ | ○ | ○ |
| Example 4 | 25 | 3 | 85 | ○ | 0 | 0.9 | Δ | ○ | ○ |
| Example 5 | 25 | 3.5 | 70 | ○ | 0 | 0.8 | ○ | ○ | ○ |
| Example 6 | 25 | 3.5 | 60 | ○ | 0 | 0.6 | ○ | ○ | ○ |
| Example 7 | 25 | 3.5 | 60 | ○ | 0 | 0.6 | ○ | ○ | ○ |
| Example 8 | 25 | 3.5 | 60 | ○ | 0 | 0.6 | ○ | ○ | ○ |
| Example 9 | 25 | 3.4 | 60 | ○ | 0 | 0.6 | ○ | ○ | ○ |
| Example 10 | 25 | 3.5 | 60 | ○ | 0 | 0.6 | ○ | ○ | ○ |
| Example 11 | 25 | 3.5 | 60 | ○ | 0 | 0.6 | ○ | ○ | ○ |
| Example 12 | 25 | 3.2 | 55 | ○ | 0 | 0.5 | ○ | ○ | ○ |
| Example 13 | 25 | 3.5 | 60 | ○ | 0 | 0.6 | ○ | ○ | ○ |
| Example 14 | 25 | 3.5 | 60 | ○ | 0 | 0.6 | ○ | ○ | ○ |
| Example 15 | 25 | 3.5 | 60 | ○ | 0 | 0.6 | ○ | ○ | ○ |
| Comparative Example 1 | 25 | 5.3 | 50 | ○ | 0 | 0.5 | x | ○ | ○ |
| Comparative Example 2 | 25 | Peeled during test | Dissolved during test | ○ | Dissolved during test | Dissolved during test | x | x | Δ |
| Comparative Example 3 | 25 | 3.5 | 80 | ○ | 30 | 0.9 | x | x | ○ |

Examples 2 to 27

Antifogging articles were produced by repeating the procedure of Example 1 with the exception that the conditions for producing the antifogging film-forming material of Example 1 were modified in terms of the compound represented by general formula [1] (the X group, the Y group, the ratio of a:b, the weight average molecular weight), the multifunctional epoxy compound, the quaternary ammonium salt or quaternary phosphonium salt, the molar amount of epoxy group relative to that of carboxyl group, the weight average molecular weight of the antifogging film-forming material, the solvent for the coating liquid for forming an antifogging film, the curing agent, the temperature for the step of curing the antifogging film, and the compound forming the primer layer of the antifogging article, followed by performing evaluations of them. The conditions for producing the coating liquid for forming an antifogging film and the antifogging article are shown in Tables 1, 3, 5, 7 and 9, and the results of quality evaluations on the obtained antifogging articles are shown in Tables 2, 4, 6, 8 and 10.

In Tables, a repeating structure where the X group is represented by "—C(=O)N(CH$_3$)$_2$" is a structure formed by using N,N-dimethyl acrylamide as the raw material. A repeating structure where the Y group is represented by "—C(=O)OC$_2$H$_4$COOH" is a structure formed by using β-carboxyethyl acrylate as the raw material. A repeating structure where the Y group is represented by "—C(=O)OC$_2$H$_4$O(C=O)C$_2$H$_4$COOH" is a structure formed by using mono(2-acryloyloxyethyl) succinate as the raw material. "TPEPB" means triphenylethylphosphonium bromide. "APTES" means 3-aminopropyltriethoxysilane. Additionally, "T403" means polyoxyalkylenetriamine (available from MITSUI FINE CHEMICALS, Inc. under the trade name of "T403"). In Example 12, T403 was added to the coating liquid for forming an antifogging film in such a manner that T403 was 1 mass % relative to the total amount of the solid matter in the coating liquid for forming an antifogging film.

In Example 20, the weight average molecular weight of the antifogging film-forming material was so large that a long period of time was spent in dissolving the antifogging film-forming material in the solvent. In Example 22, the weight average molecular weight of the compound represented by the general formula [1] was so large that the viscosity of the coating liquid for forming an antifogging film was increased, and therefore a long period of time was spent in leveling the coating film at the time of applying the coating liquid onto the base material as compared with other examples. Furthermore, in Example 25, the weight average molecular weight of the compound represented by the general formula [1] was larger than that in Example 22, so that the viscosity of the coating liquid for forming an antifogging film was further increased, and therefore a far longer period of time was spent than that in Example 22 in leveling the coating film at the time of applying the coating liquid onto the base material.

Comparative Example 1

An antifogging article was produced by repeating the procedure of Example 1 with the exception that "the compound represented by the general formula [1]" was not used, followed by performing evaluations thereon. The antifogging film of the obtained antifogging article was insufficient in abrasion resistance. In addition, the film was also inferior in acid resistance, so that the antifogging film was dissolved during the evaluation test. The conditions for producing the coating liquid for forming an antifogging film and the antifogging article are shown in Table 1, and the results of quality evaluations on the obtained antifogging article are shown in Table 2.

Comparative Example 2

An antifogging article was produced by repeating the procedure of Example 1 with the exception that "the multifunctional epoxy compound" was not used, followed by performing evaluations thereon. The antifogging film of the obtained antifogging article caused peeling during an abrasion resistance test and therefore found to be insufficient in abrasion resistance. In addition, the antifogging film was dissolved during an antifogging property test against 35° C. steam and an acid resistance test and an alkali resistance test. The conditions for producing the coating liquid for forming an antifogging film and the antifogging article are shown in Table 1, and the results of quality evaluations on the obtained antifogging article are shown in Table 2.

Comparative Example 3

An antifogging article was produced by repeating the procedure of Example 1 with the exception that "the quaternary ammonium salt or quaternary phosphonium salt" was not used, followed by performing evaluations thereon. The antifogging film of the obtained antifogging article was inferior in acid resistance and alkali resistance. The conditions for producing the coating liquid for forming an antifogging film and the antifogging article are shown in Table 1, and the results of quality evaluations on the obtained antifogging article are shown in Table 2.

Comparative Example 4

An antifogging article was produced by repeating the procedure of Example 1 with the exception that a compound having a ratio of a:b=3:1 was used as the compound represented by the general formula [1] and used for producing the antifogging film-forming material, followed by performing evaluations thereon. The antifogging film of the obtained antifogging article was inferior in abrasion resistance, acid resistance and alkali resistance. The conditions for producing the coating liquid for forming an antifogging film and the antifogging article are shown in Table 3, and the results of quality evaluations on the obtained antifogging article are shown in Table 4.

Comparative Example 5

An antifogging article was produced by repeating the procedure of Example 1 with the exception that a compound having a ratio of a:b=0.5:1 was used as the compound represented by the general formula [1] and used for producing the antifogging film-forming material, followed by performing evaluations thereon. The antifogging film of the obtained antifogging article was inferior in alkali resistance. Additionally, the antifogging property reduction during a heat resistance test was large. The conditions for producing the coating liquid for forming an antifogging film and the antifogging article are shown in Table 3, and the results of quality evaluations on the obtained antifogging article are shown in Table 4.

Comparative Example 6

An antifogging article was produced by repeating the procedure of Example 1 with the exception that EX-622 (sorbitol polyglycidyl ether available from Nagase ChemteX Corporation, water-insoluble and having a solubility of not more than 40 mass % in 25° C. water) was used as the multifunctional epoxy compound. The antifogging film of the obtained antifogging article was whitish, and therefore an antifogging article good in viewability could not be obtained. It was not possible to evaluate the variation in haze values and the apparent hazing degree correctly since the film had such a whitish appearance, and more specifically, the antifogging film was not correctly evaluated in terms of abrasion resistance, antifogging property and heat resistance. Moreover, the antifogging film was found to be inferior in acid resistance and alkali resistance because the film was dissolved during the test therefor. The conditions for producing the coating liquid for forming an antifogging film and the antifogging article are shown in Table 5, and the results of quality evaluations on the obtained antifogging article are shown in Table 6.

Comparative Example 7

An antifogging article was produced by repeating the procedure of Example 1 with the exception that an antifogging film-forming material having a weight average molecular weight of 85,000 was used. The obtained antifogging article was inferior in abrasion resistance, acid resistance and alkali resistance. The conditions for producing the coating liquid for forming an antifogging film and the antifogging article are shown in Table 7, and the results of quality evaluations on the obtained antifogging article are shown in Table 8.

Comparative Example 8

An antifogging article was produced by repeating the procedure of Example 1 with the exception that an antifogging film-forming material having a weight average molecular weight of 7,000,000 was used. However, a part of the antifogging film-forming material was not dissolved in methanol, so that a uniform coating liquid for forming an antifogging film was not obtained, and therefore the formation of the film was not achieved.

TABLE 3

| | Coating liquid for forming antifogging film Antifogging film-forming material | | | | | | | |
|---|---|---|---|---|---|---|---|---|
| | Compound represented by general formula [1] | | | | Multifunctional epoxy compound | | | Quaternary ammonium salt or quaternary phosphonium salt |
| | —X | —Y | a:b | Weight average molecular weight | Kind | Solubility in water [mass %] | Average number of functional groups | |
| Example 16 | —C(=O)N(C$_2$H$_5$)$_2$ | —COOH | 2.3:1 | 60,000 | EX-421 | 88 | 3 | TPBPB |
| Example 17 | —C(=O)N(C$_2$H$_5$)$_2$ | —COOH | 0.8:1 | 60,000 | EX-421 | 88 | 3 | TPBPB |
| Comparative Example 4 | —C(=O)N(C$_2$H$_5$)$_2$ | —COOH | 3:1 | 60,000 | EX-421 | 88 | 3 | TPBPB |
| Comparative Example 5 | —C(=O)N(C$_2$H$_5$)$_2$ | —COOH | 0.5:1 | 60,000 | EX-421 | 88 | 3 | TPBPB |

| | Coating liquid for forming antifogging film Antifogging film-forming material | | | | | | |
|---|---|---|---|---|---|---|---|
| | Molar amount of epoxy group relative to 1 mol of carboxyl group | Weight average molecular weight | Solvent | Curing agent | Temperature for curing step [° C.] | Compound for forming primer layer | Film-rinsing step |
| Example 16 | 1.4 | 300,000 | MeOH | None | 80 | GPTMS | None |
| Example 17 | 1.4 | 300,000 | MeOH | None | 80 | GPTMS | None |
| Comparative Example 4 | 1.4 | 300,000 | MeOH | None | 80 | GPTMS | None |
| Comparative Example 5 | 1.4 | 300,000 | MeOH | None | 80 | GPTMS | None |

TABLE 4

| | Film thickness [μm] | Difference of haze value between before and after abrasion resistance test | Antifogging property against 35° C. steam [sec] | Heat resistance | | Water absorption saturation condition per unit area of antifogging film [mg/cm$^2$] | Acid resistance | Alkali resistance | Adhesion |
|---|---|---|---|---|---|---|---|---|---|
| | | | | Outward appearance | Antifogging property reduction [%] | | | | |
| Example 16 | 25 | 3.8 | 70 | ○ | 0 | 0.7 | ○ | ○ | Δ |
| Example 17 | 25 | 3.5 | 70 | ○ | 30 | 0.7 | ○ | Δ | ○ |
| Comparative Example 4 | 25 | 6 | 80 | ○ | 0 | 0.8 | x | x | Δ |
| Comparative Example 5 | 25 | 3.5 | 80 | ○ | 50 | 0.8 | Δ | x | ○ |

TABLE 5

| | Coating liquid for forming antifogging film Antifogging film-forming material | | | | | | | |
|---|---|---|---|---|---|---|---|---|
| | Compound represented by general formula [1] | | | | Multifunctional epoxy compound | | | Quaternary ammonium salt or quaternary phosphonium salt |
| | —X | —Y | a:b | Weight average molecular weight | Kind | Solubility in water [mass %] | Average number of functional groups | |
| Example 18 | —C(=O)N(C$_2$H$_5$)$_2$ | —COOH | 1.3:1 | 60,000 | EX-611 | 48 | 4 | TPBPB |
| Comparative Example 6 | —C(=O)N(C$_2$H$_5$)$_2$ | —COOH | 1.3:1 | 60,000 | EX-622 | <40 (Undissolved) | 4.9 | TPBPB |

TABLE 5-continued

| | Coating liquid for forming antifogging film | | | | | | |
|---|---|---|---|---|---|---|---|
| | Antifogging film-forming material | | | | | | |
| | Molar amount of epoxy group relative to 1 mol of carboxyl group | Weight average molecular weight | Solvent | Curing agent | Temperature for curing step [° C.] | Compound for forming primer layer | Film-rinsing step |
| Example 18 | 1.4 | 300,000 | MeOH | None | 80 | GPTMS | None |
| Comparative Example 6 | 1.4 | 300,000 | MeOH | None | 80 | GPTMS | None |

TABLE 6

| | Film thickness [μm] | Difference of haze value between before and after abrasion resistance test | Antifogging property against 35° C. steam [sec] | Heat resistance | | Water absorption under water absorption saturation condition per unit area of antifogging film [mg/cm$^2$] | Acid resistance | Alkali resistance | Adhesion |
|---|---|---|---|---|---|---|---|---|---|
| | | | | Outward appearance | Antifogging property reduction [%] | | | | |
| Example 18 | 25 | 5 | 50 | ○ | 0 | 0.5 | Δ | Δ | ○ |
| Comparative Example 6 | 25 | — | — | — | — | — | x | x | ○ |

TABLE 7

| | Coating liquid for forming antifogging film Antifogging film-forming material | | | | | | | |
|---|---|---|---|---|---|---|---|---|
| | Compound represented by general formula [1] | | | | Multifunctional epoxy compound | | | Quaternary ammonium salt or quaternary phosphonium salt |
| | —X | —Y | a:b | Weight average molecular weight | Kind | Solubility in water [mass %] | Average number of functional groups | |
| Example 19 | —C(=O)N(C$_2$H$_5$)$_2$ | —COOH | 1:3:1 | 60,000 | EX-421 | 88 | 3 | TPBPB |
| Example 20 | —C(=O)N(C$_2$H$_5$)$_2$ | —COOH | 1:3:1 | 60,000 | EX-421 | 88 | 3 | TPBPB |
| Comparative Example 7 | —C(=O)N(C$_2$H$_5$)$_2$ | —COOH | 1:3:1 | 60,000 | EX-421 | 88 | 3 | TPBPB |
| Comparative Example 8 | —C(=O)N(C$_2$H$_5$)$_2$ | —COOH | 1:3:1 | 60,000 | EX-421 | 88 | 3 | TPBPB |

| | Coating liquid for forming antifogging film | | | | | | |
|---|---|---|---|---|---|---|---|
| | Antifogging film-forming material | | | | | | |
| | Molar amount of epoxy group relative to 1 mol of carboxyl group | Weight average molecular weight | Solvent | Curing agent | Temperature for curing step [° C.] | Compound for forming primer layer | Film-rinsing step |
| Example 19 | 1.4 | 200,000 | MeOH | None | 80 | GPTMS | None |
| Example 20 | 1.4 | 2,500,000 | MeOH | None | 80 | GPTMS | None |
| Comparative Example 7 | 1.4 | 85,000 | MeOH | None | 80 | GPTMS | None |
| Comparative Example 8 | 1.4 | 7,000,000 | MeOH | None | 80 | GPTMS | None |

TABLE 8

| | Film thickness [μm] | Difference of haze value between before and after abrasion resistance test | Antifogging property against 35° C. steam [sec] | Heat resistance Outward appearance | Heat resistance Antifogging property reduction [%] | Water absorption under water absorption saturation condition per unit area of antifogging film [mg/cm$^2$] | Acid resistance | Alkali resistance | Adhesion |
|---|---|---|---|---|---|---|---|---|---|
| Example 19 | 25 | 3.5 | 60 | ○ | 0 | 0.6 | ○ | ○ | ○ |
| Example 20 | 25 | 3.5 | 60 | ○ | 0 | 0.6 | ○ | ○ | ○ |
| Comparative Example 7 | 25 | 9 | 80 | ○ | 30 | 0.6 | X | X | ○ |
| Comparative Example 8 | — | — | — | — | — | — | — | — | — |

TABLE 9

Coating liquid for forming antifogging film
Antifogging film-forming material

| | Compound represented by general formula [1] —X | —Y | a:b | Weight average molecular weight | Multifunctional epoxy compound Kind | Multifunctional epoxy compound Solubility in water [mass %] | Average number of functional groups | Quaternary ammonium salt or quaternary phosphonium salt |
|---|---|---|---|---|---|---|---|---|
| Example 21 | —C(=O)N(C$_2$H$_5$)$_2$ | —COOH | 1:3:1 | 20,000 | EX-421 | 88 | 3 | TPBPB |
| Example 22 | —C(=O)N(C$_2$H$_5$)$_2$ | —COOH | 1:3:1 | 400,000 | EX-421 | 88 | 3 | TPBPB |
| Example 23 | —C(=O)N(C$_2$H$_5$)$_2$ | —COOH | 1:3:1 | 60,000 | EX-421 | 88 | 3 | TPBPB |
| Example 24 | —C(=O)N(C$_2$H$_5$)$_2$ | —COOH | 1:3:1 | 8000 | EX-421 | 88 | 3 | TPBPB |
| Example 25 | —C(=O)N(C$_2$H$_5$)$_2$ | —COOH | 1:3:1 | 600,000 | EX-421 | 88 | 3 | TPBPB |
| Example 26 | —C(=O)N(C$_2$H$_5$)$_2$ | —COOH | 1:3:1 | 40,000 | EX-421 | 88 | 3 | TPBPB |
| Example 27 | —C(=O)N(C$_2$H$_5$)$_2$ | —COOH | 1:3:1 | 190,000 | EX-421 | 88 | 3 | TPBPB |

| | Antifogging film-forming material Molar amount of epoxy group relative to 1 mol of carboxyl group | Weight average molecular weight | Solvent | Curing agent | Temperature for curing step [° C.] | Compound for forming primer layer | Film-rinsing step |
|---|---|---|---|---|---|---|---|
| Example 21 | 1.4 | 110,000 | MeOH | None | 80 | GPTMS | None |
| Example 22 | 1.4 | 1,000,000 | MeOH | None | 80 | GPTMS | None |
| Example 23 | 1.9 | 110,000 | MeOH | None | 80 | GPTMS | None |
| Example 24 | 1.4 | 105,000 | MeOH | None | 80 | GPTMS | None |
| Example 25 | 1.4 | 3,000,000 | MeOH | None | 80 | GPTMS | None |
| Example 26 | 1.4 | 120,000 | MeOH | None | 80 | GPTMS | None |
| Example 27 | 1.4 | 500,000 | MeOH | None | 80 | GPTMS | None |

TABLE 10

| | Film thickness [μm] | Difference of haze value between before and after abrasion resistance test | Antifogging property against 35° C. steam [sec] | Heat resistance Outward appearance | Heat resistance Antifogging property reduction [%] | Water absorption under water absorption saturation condition per unit area of antifogging film [mg/cm$^2$] | Acid resistance | Alkali resistance | Adhesion |
|---|---|---|---|---|---|---|---|---|---|
| Example 21 | 25 | 4.2 | 60 | ○ | 0 | 0.6 | ○ | ○ | ○ |
| Example 22 | 25 | 3.5 | 60 | ○ | 0 | 0.6 | ○ | ○ | ○ |
| Example 23 | 25 | 5 | 60 | ○ | 0 | 0.6 | Δ | ○ | ○ |

TABLE 10-continued

| | Film thickness [μm] | Difference of haze value between before and after abrasion resistance test | Antifogging property against 35° C. steam [sec] | Heat resistance | | Water absorption under water absorption saturation condition per unit area of antifogging film [mg/cm$^2$] | Acid resistance | Alkali resistance | Adhesion |
|---|---|---|---|---|---|---|---|---|---|
| | | | | Outward appearance | Antifogging property reduction [%] | | | | |
| Example 24 | 25 | 4.8 | 60 | ○ | 0 | 0.6 | Δ | Δ | ○ |
| Example 25 | 25 | 3.5 | 60 | ○ | 0 | 0.6 | ○ | ○ | ○ |
| Example 26 | 25 | 3.5 | 60 | ○ | 0 | 0.6 | ○ | ○ | ○ |
| Example 27 | 25 | 3.5 | 60 | ○ | 0 | 0.6 | ○ | ○ | ○ |

Examples 28 to 54, Comparative Examples 9 to 16

Antifogging articles were produced by repeating the procedure of Examples 1 to 27 and Comparative Examples 1 to 8, respectively, with the exception that the surface of the antifogging film was rinsed with flushing water after the curing step, followed by performing evaluations thereon. The conditions for producing the coating liquid for forming an antifogging film and the antifogging article are shown in Tables 11, 13, 15, 17 and 19, and the results of quality evaluations on the obtained antifogging articles are shown in Tables 12, 14, 16, 18 and 20. It was found that the antifogging film was improved in water absorption under water absorption saturation condition per unit area and in antifogging property against 35° C. steam.

In Example 47, the weight average molecular weight of the antifogging film-forming material was so large that a long period of time was spent in dissolving the antifogging film-forming material in the solvent, which was similar to Example 20. In Example 49, the weight average molecular weight of the compound represented by the general formula [1] was so large that the viscosity of the coating liquid for forming an antifogging film was increased, and therefore a long period of time was spent in leveling the coating film at the time of applying the coating liquid onto the base material as compared with other examples, which was similar to Example 22. Furthermore, in Example 52, the weight average molecular weight of the compound represented by the general formula [1] was larger than that in Example 49, so that the viscosity of the coating liquid for forming an antifogging film was further increased, and therefore a far longer period of time was spent than that in Example 49 in leveling the coating film at the time of applying the coating liquid onto the base material, which was similar to Example 25. In Comparative Example 14, the antifogging film of the obtained antifogging article had a whitish appearance so that an antifogging article good in viewability was not obtained. It was not possible to evaluate the variation in haze values and the apparent hazing degree correctly since the film had such a whitish appearance, and more specifically, the antifogging film was not correctly evaluated in terms of abrasion resistance, antifogging property and heat resistance. Moreover, in Comparative Example 16, a part of the antifogging film-forming material was not dissolved in methanol, so that a uniform coating liquid for forming an antifogging film was not obtained, and therefore the formation of the film was not achieved.

Example 55

To the solution produced by the liquid preparation step of Example 1 to contain the antifogging film-forming material, methanol as a solvent was added and additionally colloidal silica (available from Nissan Chemical Industries, Ltd. under the trade name of IPA-ST-L having an average particle diameter of 40 nm) was added, thereby preparing a coating liquid for forming an antifogging film. At this time, IPA-ST-L was added such that its solid content was 5 parts by mass relative to 100 parts by mass of the solid content of the antifogging film. An antifogging article was produced by repeating the procedure of Example 1 with the exception of the above, followed by performing evaluations thereon. The characteristics of the thus obtained antifogging article (thickness of the antifogging film, abrasion resistance, antifogging property against 35° C. steam, heat resistance, water absorption under water absorption saturation condition per unit area of the antifogging film, acid resistance, alkali resistance and adhesion) were similar to those of Example 1 as shown in Table 20. In a case where an artificial sweat-like liquid as a contaminant (discussed in JIS L 0848) was brought into contact with a part of the surface of the antifogging film of the antifogging article and absorbed thereinto, the difference of exterior distortion between the part in which the liquid was absorbed and a part in which the liquid was not absorbed was found to be reduced as compared with that in the case of Example 1 where the above-mentioned fine particles were not contained in the antifogging film.

Example 56

To the solution produced by the liquid preparation step of Example 28 to contain the antifogging film-forming material, methanol as a solvent was added and additionally colloidal silica (available from Nissan Chemical Industries, Ltd. under the trade name of IPA-ST-L having an average particle diameter of 40 nm) was added, thereby preparing a coating liquid for forming an antifogging film. At this time, IPA-ST-L was added such that its solid content was 5 parts by mass relative to 100 parts by mass of the solid content of the antifogging film. An antifogging article was produced by repeating the procedure of Example 28 with the exception of the above, followed by performing evaluations thereon. The characteristics of the thus obtained antifogging article (thickness of the antifogging film, abrasion resistance, antifogging property against 35° C. steam, heat resistance, water absorption under water absorption saturation condition per unit area of the antifogging film, acid resistance, alkali resistance and adhesion) were similar to those of Example 28 as shown in Table 20. In a case where an artificial sweat-like liquid as a contaminant (discussed in JIS L 0848) was brought into contact with a part of the surface of the antifogging film of the antifogging article and absorbed thereinto, the difference of exterior distortion between the part in which the liquid was absorbed and a part in which the liquid was not absorbed was found to be reduced as compared with that in the case of Example 28 where the above-mentioned fine particles were not contained in the antifogging film.

Example 57

To the solution produced by the liquid preparation step of Example 1 to contain the antifogging film-forming material, methanol as a solvent was added and additionally colloidal silica (available from Nissan Chemical Industries, Ltd. under the trade name of IPA-ST-L having an average particle diameter of 40 nm) was added, thereby preparing a coating liquid for forming an antifogging film. At this time, IPA-ST-L was added such that its solid content was 10 parts by mass relative to 100 parts by mass of the solid content of the antifogging film. An antifogging article was produced by repeating the procedure of Example 1 with the exception of the above, followed by performing evaluations thereon. The characteristics of the thus obtained antifogging article (thickness of the antifogging film, abrasion resistance, antifogging property against 35° C. steam, heat resistance, water absorption under water absorption saturation condition per unit area of the antifogging film, acid resistance, alkali resistance and adhesion) were similar to those of Example 1 as shown in Table 20. In a case where an artificial sweat-like liquid as a contaminant (discussed in JIS L 0848) was brought into contact with a part of the surface of the antifogging film of the antifogging article and absorbed thereinto, the difference of exterior distortion between the part in which the liquid was absorbed and a part in which the liquid was not absorbed was found to be reduced as compared with that in the case of Example 1 where the above-mentioned fine particles were not contained in the antifogging film.

Example 58

To the solution produced by the liquid preparation step of Example 28 to contain the antifogging film-forming material, methanol as a solvent was added and additionally colloidal silica (available from Nissan Chemical Industries, Ltd. under the trade name of IPA-ST-L having an average particle diameter of 40 nm) was added, thereby preparing a coating liquid for forming an antifogging film. At this time, IPA-ST-L was added such that its solid content was 10 parts by mass relative to 100 parts by mass of the solid content of the antifogging film. An antifogging article was produced by repeating the procedure of Example 28 with the exception of the above, followed by performing evaluations thereon. The characteristics of the thus obtained antifogging article (thickness of the antifogging film, abrasion resistance, antifogging property against 35° C. steam, heat resistance, water absorption under water absorption saturation condition per unit area of the antifogging film, acid resistance, alkali resistance and adhesion) were similar to those of Example 28 as shown in Table 20. In a case where an artificial sweat-like liquid as a contaminant (discussed in JIS L 0848) was brought into contact with a part of the surface of the antifogging film of the antifogging article and absorbed thereinto, the difference of exterior distortion between the part in which the liquid was absorbed and a part in which the liquid was not absorbed was found to be reduced as compared with that in the case of Example 28 where the above-mentioned fine particles were not contained in the antifogging film.

Example 59

To the solution produced by the liquid preparation step of Example 1 to contain the antifogging film-forming material, methanol as a solvent was added and additionally colloidal silica (available from Nissan Chemical Industries, Ltd. under the trade name of IPA-ST-L having an average particle diameter of 40 nm) was added, thereby preparing a coating liquid for forming an antifogging film. At this time, IPA-ST-L was added such that its solid content was 20 parts by mass relative to 100 parts by mass of the solid content of the antifogging film. An antifogging article was produced by repeating the procedure of Example 1 with the exception of the above, followed by performing evaluations thereon. The characteristics of the thus obtained antifogging article (thickness of the antifogging film, abrasion resistance, antifogging property against 35° C. steam, heat resistance, water absorption under water absorption saturation condition per unit area of the antifogging film, acid resistance, alkali resistance and adhesion) were similar to those of Example 1 as shown in Table 20. In a case where an artificial sweat-like liquid as a contaminant (discussed in JIS L 0848) was brought into contact with a part of the surface of the antifogging film of the antifogging article and absorbed thereinto, the difference of exterior distortion between the part in which the liquid was absorbed and a part in which the liquid was not absorbed was found to be reduced as compared with that in the case of Example 1 where the above-mentioned fine particles were not contained in the antifogging film.

Example 60

To the solution produced by the liquid preparation step of Example 28 to contain the antifogging film-forming material, methanol as a solvent was added and additionally colloidal silica (available from Nissan Chemical Industries, Ltd. under the trade name of IPA-ST-L having an average particle diameter of 40 nm) was added, thereby preparing a coating liquid for forming an antifogging film. At this time, IPA-ST-L was added such that its solid content was 20 parts by mass relative to 100 parts by mass of the solid content of the antifogging film. An antifogging article was produced by repeating the procedure of Example 28 with the exception of the above, followed by performing evaluations thereon. The characteristics of the thus obtained antifogging article (thickness of the antifogging film, abrasion resistance, antifogging property against 35° C. steam, heat resistance, water absorption under water absorption saturation condition per unit area of the antifogging film, acid resistance, alkali resistance and adhesion) were similar to those of Example 28 as shown in Table 20. In a case where an artificial sweat-like liquid as a contaminant (discussed in JIS L 0848) was brought into contact with a part of the surface of the antifogging film of the antifogging article and absorbed thereinto, the difference of exterior distortion between the part in which the liquid was absorbed and a part in which the liquid was not absorbed was found to be reduced as compared with that in the case of Example 28 where the above-mentioned fine particles were not contained in the antifogging film.

Example 61

Polyacrylic resin as an overcoat layer (available from TOAGOSEI CO., LTD. under the trade name of "JURYMER" No. AC-10LP, having a weight average molecular weight of 25,000) (hereinafter sometimes referred to as "PAA25000") and polyglycerol polyglycidyl ether as a multifunctional epoxy monomer (available from Nagase ChemteX Corporation under the trade name of "DENACOL EX-512", having a solubility of 100 mass % in 25° C. water) were used as raw materials. PAA25000 in an amount of 0.06 g was dissolved in 19.8 g of methanol and then 0.14 g of EX-512 was added thereto, thereby preparing a coating liquid for forming an overcoat layer. The coating liquid for forming an overcoat layer was applied onto the antifogging film produced in Example 1 by spin coating. The base material to which the coating liquid was applied was brought into an electric furnace kept at 80° C. for 1 hour to cause curing, followed by rinsing the surface of the antifogging film with flushing water in the same manner as Example 28, thereby obtaining an antifogging article where an overcoat layer was formed on the antifogging film. The density of the overcoat layer was determined by measuring the critical angle by X-Ray reflectivity and analyzing the same. The density determination by X-Ray reflectivity is particularly discussed in Non-Patent Publication 1. In Examples of the present invention, the density was obtained by XRD measurement apparatus (available from Rigaku Corporation under the trade name of RINT-UltimaIII) accompanied with a general-purpose analysis program. As a result, the overcoat layer was found to have a density of 0.62 g/cm$^3$. Results of the quality evaluations on the obtained antifogging article are shown in Table 21.

Example 62

Polyacrylic resin as an overcoat layer (AC-10P, having a weight average molecular weight of 5,000) (hereinafter sometimes referred to as "PAA5000") and glycerol polyglycidyl ether as a multifunctional epoxy monomer (DENACOL EX-421 having a solubility of 88 mass % in 25° C. water) were used as raw materials. PAA5000 in an amount of 0.03 g was dissolved in 19.9 g of methanol and then 0.07 g of EX-421 was added thereto, thereby preparing a coating liquid for forming an overcoat layer. The coating liquid for forming an overcoat layer was applied onto the antifogging film produced in Example 1 by spin coating. The base material to which the coating liquid was applied was brought into an electric furnace kept at 80° C. for 1 hour to cause curing, followed by rinsing the surface of the antifogging film with flushing water in the same manner as Example 28, thereby obtaining an antifogging article where an overcoat layer was formed on the antifogging film. The overcoat layer was found to have a density of 0.59 g/cm$^3$. Results of the quality evaluations on the obtained antifogging article are shown in Table 21.

Reference Example 1

Isopropanol in an amount of 20.20 g was charged with 3.31 g of organosilica sol as an overcoat layer (available from Nissan Chemical Industries, No. IPA-ST, having a primary particle diameter of 10-15 nm) and 0.34 g of dimethyldimethoxysilane (available from Tokyo Chemical Industry Co., Ltd.) and stirred for 10 minutes at 25° C. While stirring the solution, 0.15 g of a 10 mass % nitric acid aqueous solution was added dropwise thereto, followed by continuing the stirring for 5 hours at 25° C. Thereafter, 0.03 g of a leveling agent (BYK307 available from BYK Additives & Instruments) was added thereby preparing a coating liquid for forming an overcoat layer. The coating liquid for forming an overcoat layer was applied onto the antifogging film produced in Example 1 by spin coating. The base material to which the coating liquid was applied was brought into an electric furnace kept at 110° C. for 30 minutes to cause curing, followed by rinsing the surface of the antifogging film with flushing water in the same manner as Example 28, thereby obtaining an antifogging article where an overcoat layer was formed on the antifogging film. The overcoat layer was found to have a density of 1.12 g/cm$^3$. Results of the quality evaluations on the obtained antifogging article are shown in Table 21. The antifogging film of the obtained antifogging article was whitish, and therefore an antifogging article good in viewability could not be obtained. It was not possible to evaluate the variation in haze values and the apparent hazing degree correctly since the film had such a whitish appearance, and more specifically, the antifogging film was not correctly evaluated in terms of abrasion resistance, antifogging property and heat resistance. Concerning the water absorption under water absorption saturation condition per unit area of the antifogging film, acid resistance, alkali resistance, adhesion and contamination resistance (coloring resistance), evaluations were omitted.

TABLE 11

| | Coating liquid for forming antifogging film Antifogging film-forming material | | | | | | | |
|---|---|---|---|---|---|---|---|---|
| | Compound represented by general formula [1] | | | | Multifunctional epoxy compound | | Quaternary ammonium salt or quaternary phosphonium salt |
| | —X | —Y | a:b | Weight average molecular weight | Kind | Solubility in water [mass %] | Average number of functional groups | |
| Example 28 | —C(=O)N(C$_2$H$_5$)$_2$ | —COOH | 1:3:1 | 60,000 | EX-421 | 88 | 3 | TPBPB |
| Example 29 | —C(=O)N(CH$_3$)$_2$ | —COOH | 1:3:1 | 60,000 | EX-421 | 88 | 3 | TPBPB |
| Example 30 | —C(=O)N(C$_2$H$_5$)$_2$ | —C(=O)OC$_2$H$_4$COOH | 1:3:1 | 60,000 | EX-421 | 88 | 3 | TPBPB |
| Example 31 | —C(=O)N(CH$_3$)$_2$ | —C(=O)OC$_2$H$_4$O—C(=O)C$_2$H$_4$COOH | 1:3:1 | 60,000 | EX-421 | 88 | 3 | TPBPB |
| Example 32 | —C(=O)N(C$_2$H$_5$)$_2$ | —COOH | 2:0:1 | 60,000 | EX-421 | 88 | 3 | TPBPB |
| Example 33 | —C(=O)N(C$_2$H$_5$)$_2$ | —COOH | 1:3:1 | 100,000 | EX-421 | 88 | 3 | TPBPB |
| Example 34 | —C(=O)N(C$_2$H$_5$)$_2$ | —COOH | 1:3:1 | 60,000 | EX-313 | 99 | 2 | TPBPB |
| Example 35 | —C(=O)N(C$_2$H$_5$)$_2$ | —COOH | 1:3:1 | 60,000 | EX-421 | 88 | 3 | TPEPB |
| Example 36 | —C(=O)N(C$_2$H$_5$)$_2$ | —COOH | 1:3:1 | 60,000 | EX-421 | 88 | 3 | TPBPB |
| Example 37 | —C(=O)N(C$_2$H$_5$)$_2$ | —COOH | 1:3:1 | 60,000 | EX-421 | 88 | 3 | TPBPB |
| Example 38 | —C(=O)N(C$_2$H$_5$)$_2$ | —COOH | 1:3:1 | 60,000 | EX-421 | 88 | 3 | TPBPB |
| Example 39 | —C(=O)N(C$_2$H$_5$)$_2$ | —COOH | 1:3:1 | 60,000 | EX-421 | 88 | 3 | TPBPB |

TABLE 11-continued

| | | | | | | | | |
|---|---|---|---|---|---|---|---|---|
| Example 40 | —C(=O)N(C₂H₅)₂ | —COOH | 1:3:1 | 60,000 | EX-421 | 88 | 3 | TPBPB |
| Example 41 | —C(=O)N(C₂H₅)₂ | —COOH | 1:3:1 | 60,000 | EX-421 | 88 | 3 | TPBPB |
| Example 42 | —C(=O)N(C₂H₅)₂ | —COOH | 1:3:1 | 60,000 | EX-421 | 88 | 3 | TPBPB |
| Comparative Example 9 | | None | | | EX-421 | 88 | 3 | TPBPB |
| Comparative Example 10 | —C(=O)N(C₂H₅)₂ | —COOH | 1:3:1 | 60,000 | | None | | TPBPB |
| Comparative Example 11 | —C(=O)N(C₂H₅)₂ | —COOH | 1:3:1 | 60,000 | EX-421 | 88 | 3 | None |

| | Coating liquid for forming antifogging film | | | | | | |
|---|---|---|---|---|---|---|---|
| | Antifogging film-forming material | | | | | | |
| | Molar amount of epoxy group relative to 1 mol of carboxyl group | Weight average molecular weight | Solvent | Curing agent | Temperature for curing step [° C.] | Compound for forming primer layer | Film-rinsing step |
| Example 28 | 1.4 | 300,000 | MeOH | None | 80 | GPTMS | Done |
| Example 29 | 1.4 | 300,000 | MeOH | None | 80 | GPTMS | Done |
| Example 30 | 1.4 | 300,000 | MeOH | None | 80 | GPTMS | Done |
| Example 31 | 1.4 | 300,000 | MeOH | None | 80 | GPTMS | Done |
| Example 32 | 1.4 | 300,000 | MeOH | None | 80 | GPTMS | Done |
| Example 33 | 1.4 | 300,000 | MeOH | None | 80 | GPTMS | Done |
| Example 34 | 1.4 | 300,000 | MeOH | None | 80 | GPTMS | Done |
| Example 35 | 1.4 | 300,000 | MeOH | None | 80 | GPTMS | Done |
| Example 36 | 1.6 | 300,000 | MeOH | None | 80 | GPTMS | Done |
| Example 37 | 1.4 | 2,000,000 | MeOH | None | 80 | GPTMS | Done |
| Example 38 | 1.4 | 300,000 | EtOH | None | 80 | GPTMS | Done |
| Example 39 | 1.4 | 300,000 | MeOH | T403 | 80 | GPTMS | Done |
| Example 40 | 1.4 | 300,000 | MeOH | None | 75 | GPTMS | Done |
| Example 41 | 1.4 | 300,000 | MeOH | None | 135 | GPTMS | Done |
| Example 42 | 1.4 | 300,000 | MeOH | None | 80 | APTES | Done |
| Comparative Example 9 | 1.4 | 300,000 | MeOH | None | 80 | GPTMS | Done |
| Comparative Example 10 | | | | | | | |
| Comparative Example 11 | 1.4 | 300,000 | MeOH | None | 80 | GPTMS | Done |

TABLE 12

| | Film thickness [μm] | Difference of haze value between before and after abrasion resistance test | Antifogging property against 35° C. steam [sec] | Heat resistance | | Water absorption under water absorption saturation condition per unit area of antifogging film [mg/cm²] | Acid resistance | Alkali resistance | Adhesion |
|---|---|---|---|---|---|---|---|---|---|
| | | | | Outward appearance | Antifogging property reduction [%] | | | | |
| Example 28 | 25 | 3.5 | 70 | ○ | 0 | 0.7 | ○ | ○ | ○ |
| Example 29 | 25 | 3.5 | 82 | ○ | 0 | 0.9 | ○ | ○ | ○ |
| Example 30 | 25 | 3 | 93 | ○ | 0 | 1.1 | Δ | ○ | ○ |
| Example 31 | 25 | 3 | 99 | ○ | 0 | 1.1 | Δ | ○ | ○ |
| Example 32 | 25 | 3.5 | 82 | ○ | 0 | 0.9 | ○ | ○ | ○ |
| Example 33 | 25 | 3.5 | 70 | ○ | 0 | 0.7 | ○ | ○ | ○ |
| Example 34 | 25 | 3.5 | 70 | ○ | 0 | 0.7 | ○ | ○ | ○ |
| Example 35 | 25 | 3.5 | 70 | ○ | 0 | 0.7 | ○ | ○ | ○ |
| Example 36 | 25 | 3.4 | 70 | ○ | 0 | 0.7 | ○ | ○ | ○ |
| Example 37 | 25 | 3.5 | 70 | ○ | 0 | 0.7 | ○ | ○ | ○ |
| Example 38 | 25 | 3.5 | 70 | ○ | 0 | 0.7 | ○ | ○ | ○ |
| Example 39 | 25 | 3.2 | 64 | ○ | 0 | 0.6 | ○ | ○ | ○ |
| Example 40 | 25 | 3.5 | 70 | ○ | 0 | 0.7 | ○ | ○ | ○ |
| Example 41 | 25 | 3.5 | 70 | ○ | 0 | 0.7 | ○ | ○ | ○ |
| Example 42 | 25 | 3.5 | 70 | ○ | 0 | 0.7 | ○ | ○ | ○ |
| Comparative Example 9 | 25 | 5.3 | 58 | ○ | 0 | 0.6 | X | ○ | ○ |
| Comparative Example 10 | Evaluations could not achieved since the antifogging film was peeled during the film-rinsing step. | | | | | | | | |

TABLE 12-continued

|  | Film thickness [μm] | Difference of haze value between before and after abrasion resistance test | Antifogging property against 35° C. steam [sec] | Heat resistance | | Water absorption under water absorption saturation condition per unit area of antifogging film [mg/cm²] | Acid resistance | Alkali resistance | Adhesion |
|---|---|---|---|---|---|---|---|---|---|
|  |  |  |  | Outward appearance | Antifogging property reduction [%] |  |  |  |  |
| Comparative Example 11 | 25 | 3.5 | 93 | ○ | 30 | 1.1 | X | X | ○ |

TABLE 13

Coating liquid for forming antifogging film
Antifogging film-forming material

|  | Compound represented by general formula [1] | | | | Multifunctional epoxy compound | | |
|---|---|---|---|---|---|---|---|
|  | —X | —Y | a:b | Weight average molecular weight | Kind | Solubility in water [mass %] | Average number of functional groups |
| Example 43 | —C(=O)N(C₂H₅)₂ | —COOH | 2:3:1 | 60,000 | EX-421 | 88 | 3 |
| Example 44 | —C(=O)N(C₂H₅)₂ | —COOH | 0:8:1 | 60,000 | EX-421 | 88 | 3 |
| Comparative Example 12 | —C(=O)N(C₂H₅)₂ | —COOH | 3:1 | 60,000 | EX-421 | 88 | 3 |
| Comparative Example 13 | —C(=O)N(C₂H₅)₂ | —COOH | 0:5:1 | 60,000 | EX-421 | 88 | 3 |

Coating liquid for forming antifogging film
Antifogging film-forming material

|  | Quaternary ammonium salt or quaternary phosphonium salt | Molar amount of epoxy group relative to 1 mol of carboxyl group | Weight average molecular weight | Solvent | Curing agent | Temperature for curing step [° C.] | Compound for forming primer layer | Film-rinsing step |
|---|---|---|---|---|---|---|---|---|
| Example 43 | TPBPB | 1.4 | 300,000 | MeOH | None | 80 | GPTMS | Done |
| Example 44 | TPBPB | 1.4 | 300,000 | MeOH | None | 80 | GPTMS | Done |
| Comparative Example 12 | TPBPB | 1.4 | 300,000 | MeOH | None | 80 | GPTMS | Done |
| Comparative Example 13 | TPBPB | 1.4 | 300,000 | MeOH | None | 80 | GPTMS | Done |

TABLE 14

|  | Film thickness [μm] | Difference of haze value between before and after abrasion resistance test | Antifogging property against 35° C. steam [sec] | Heat resistance | | Water absorption under water absorption saturation condition per unit area of antifogging film [mg/cm²] | Acid resistance | Alkali resistance | Adhesion |
|---|---|---|---|---|---|---|---|---|---|
|  |  |  |  | Outward appearance | Antifogging property reduction [%] |  |  |  |  |
| Example 43 | 25 | 3.8 | 82 | ○ | 0 | 0.8 | ○ | ○ | Δ |
| Example 44 | 25 | 3.5 | 82 | ○ | 30 | 0.8 | ○ | Δ | ○ |
| Comparative Example 12 | 25 | 6 | 93 | ○ | 0 | 0.9 | X | X | Δ |
| Comparative Example 13 | 25 | 3.5 | 93 | ○ | 50 | 0.9 | Δ | X | ○ |

TABLE 15

| | Coating liquid for forming antifogging film Antifogging film-forming material | | | | | | |
|---|---|---|---|---|---|---|---|
| | Compound represented by general formula [1] | | | | Multifunctional epoxy compound | | |
| | —X | —Y | a:b | Weight average molecular weight | Kind | Solubility in water [mass %] | Average number of functional groups |
| Example 45 | —C(=O)N(C$_2$H$_5$)$_2$ | —COOH | 1.3:1 | 60,000 | EX-611 | 48 | 4 |
| Comparative Example 14 | —C(=O)N(C$_2$H$_5$)$_2$ | —COOH | 1.3:1 | 60,000 | EX-622 | <40 (Undissolved) | 4.9 |

| | Coating liquid for forming antifogging film Antifogging film-forming material | | | | | | | |
|---|---|---|---|---|---|---|---|---|
| | Quaternary ammonium salt or quaternary phosphonium salt | Molar amount of epoxy group relative to 1 mol of carboxyl group | Weight average molecular weight | Solvent | Curing agent | Temperature for curing step [° C.] | Compound for forming primer layer | Film-rinsing step |
| Example 45 | TPBPB | 1.4 | 300,000 | MeOH | None | 80 | GPTMS | Done |
| Comparative Example 14 | TPBPB | 1.4 | 300,000 | MeOH | None | 80 | GPTMS | Done |

TABLE 16

| | Film thickness [μm] | Difference of haze value between before and after abrasion resistance test | Antifogging property against 35° C. steam [sec] | Heat resistance | | Water absorption under water absorption saturation condition per unit area of antifogging film [mg/cm$^2$] | Acid resistance | Alkali resistance | Adhesion |
|---|---|---|---|---|---|---|---|---|---|
| | | | | Outward appearance | Antifogging property reduction [%] | | | | |
| Example 45 | 25 | 5 | 58 | ○ | 0 | 0.6 | Δ | Δ | ○ |
| Comparative Example 14 | 25 | — | — | — | — | — | X | X | ○ |

TABLE 17

| | Coating liquid for forming antifogging film Antifogging film-forming material | | | | | | | |
|---|---|---|---|---|---|---|---|---|
| | Compound represented by general formula [1] | | | | Multifunctional epoxy compound | | | Quaternary ammonium salt or quaternary phosphonium salt |
| | —X | —Y | a:b | Weight average molecular weight | Kind | Solubility in water [mass %] | Average number of functional groups | |
| Example 46 | —C(=O)N(C$_2$H$_5$)$_2$ | —COOH | 1.3:1 | 60,000 | EX-421 | 88 | 3 | TPBPB |
| Example 47 | —C(=O)N(C$_2$H$_5$)$_2$ | —COOH | 1.3:1 | 60,000 | EX-421 | 88 | 3 | TPBPB |
| Comparative Example 15 | —C(=O)N(C$_2$H$_5$)$_2$ | —COOH | 1.3:1 | 60,000 | EX-421 | 88 | 3 | TPBPB |
| Comparative Example 16 | —C(=O)N(C$_2$H$_5$)$_2$ | —COOH | 1.3:1 | 60,000 | EX-421 | 88 | 3 | TPBPB |

TABLE 17-continued

| | Coating liquid for forming antifogging film | | | | | | |
|---|---|---|---|---|---|---|---|
| | Antifogging film-forming material | | | | | | |
| | Molar amount of epoxy group relative to 1 mol of carboxyl group | Weight average molecular weight | Solvent | Curing agent | Temperature for curing step [° C.] | Compound for forming primer layer | Film-rinsing step |
| Example 46 | 1.4 | 200,000 | MeOH | None | 80 | GPTMS | Done |
| Example 47 | 1.4 | 2,500,000 | MeOH | None | 80 | GPTMS | Done |
| Comparative Example 15 | 1.4 | 85,000 | MeOH | None | 80 | GPTMS | Done |
| Comparative Example 16 | 1.4 | 7,000,000 | MeOH | None | 80 | GPTMS | Done |

TABLE 18

| | Film thickness [μm] | Difference of haze value between before and after abrasion resistance test | Antifogging property against 35° C. steam [sec] | Heat resistance | | Water absorption under water absorption saturation condition per unit area of antifogging film [mg/cm$^2$] | Acid resistance | Alkali resistance | Adhesion |
|---|---|---|---|---|---|---|---|---|---|
| | | | | Outward appearance | Antifogging property reduction [%] | | | | |
| Example 46 | 25 | 3.5 | 70 | ○ | 0 | 0.7 | ○ | ○ | ○ |
| Example 47 | 25 | 3.5 | 70 | ○ | 0 | 0.7 | ○ | ○ | ○ |
| Comparative Example 15 | 25 | 9 | 93 | ○ | 30 | 0.7 | X | X | ○ |
| Comparative Example 16 | — | — | — | — | — | — | — | — | — |

TABLE 19

| | Coating liquid for forming antifogging film | | | | | | | |
|---|---|---|---|---|---|---|---|---|
| | Antifogging film-forming material | | | | | | | |
| | Compound represented by general formula [1] | | | | Multifunctional epoxy compound | | | Quaternary ammonium salt or quaternary phosphonium salt |
| | —X | —Y | a:b | Weight average molecular weight | Kind | Solubility in water [mass %] | Average number of functional groups | |
| Example 48 | —C(=O)N(C$_2$H$_5$)$_2$ | —COOH | 1.3:1 | 20,000 | EX-421 | 88 | 3 | TPBPB |
| Example 49 | —C(=O)N(C$_2$H$_5$)$_2$ | —COOH | 1.3:1 | 400,000 | EX-421 | 88 | 3 | TPBPB |
| Example 50 | —C(=O)N(C$_2$H$_5$)$_2$ | —COOH | 1.3:1 | 60,000 | EX-421 | 88 | 3 | TPBPB |
| Example 51 | —C(=O)N(C$_2$H$_5$)$_2$ | —COOH | 1.3:1 | 8000 | EX-421 | 88 | 3 | TPBPB |
| Example 52 | —C(=O)N(C$_2$H$_5$)$_2$ | —COOH | 1.3:1 | 600,000 | EX-421 | 88 | 3 | TPBPB |
| Example 53 | —C(=O)N(C$_2$H$_5$)$_2$ | —COOH | 1.3:1 | 40,000 | EX-421 | 88 | 3 | TPBPB |
| Example 54 | —C(=O)N(C$_2$H$_5$)$_2$ | —COOH | 1.3:1 | 190,000 | EX-421 | 88 | 3 | TPBPB |

TABLE 19-continued

Coating liquid for forming antifogging film

Antifogging film-forming material

|  | Molar amount of epoxy group relative to 1 mol of carboxyl group | Weight average molecular weight | Solvent | Curing agent | Temperature for curing step [° C.] | Compound for forming primer layer | Film-rinsing step |
|---|---|---|---|---|---|---|---|
| Example 48 | 1.4 | 110,000 | MeOH | None | 80 | GPTMS | Done |
| Example 49 | 1.4 | 1,000,000 | MeOH | None | 80 | GPTMS | Done |
| Example 50 | 1.9 | 110,000 | MeOH | None | 80 | GPTMS | Done |
| Example 51 | 1.4 | 105,000 | MeOH | None | 80 | GPTMS | Done |
| Example 52 | 1.4 | 3,000,000 | MeOH | None | 80 | GPTMS | Done |
| Example 53 | 1.4 | 120,000 | MeOH | None | 80 | GPTMS | Done |
| Example 54 | 1.4 | 500,000 | MeOH | None | 80 | GPTMS | Done |

TABLE 20

|  | Film thickness [μm] | Difference of haze value between before and after abrasion resistance test | Antifogging property against 35° C. steam [sec] | Heat resistance | | Water absorption under water absorption saturation condition per unit area of antifogging film [mg/cm²] | Acid resistance | Alkali resistance | Adhesion |
|---|---|---|---|---|---|---|---|---|---|
|  |  |  |  | Outward appearance | Antifogging property reduction [%] |  |  |  |  |
| Example 48 | 25 | 4.2 | 70 | ○ | 0 | 0.7 | ○ | ○ | ○ |
| Example 49 | 25 | 3.5 | 70 | ○ | 0 | 0.7 | ○ | ○ | ○ |
| Example 50 | 25 | 5 | 70 | ○ | 0 | 0.7 | Δ | ○ | ○ |
| Example 51 | 25 | 4.8 | 70 | ○ | 0 | 0.7 | Δ | Δ | ○ |
| Example 52 | 25 | 3.5 | 70 | ○ | 0 | 0.7 | ○ | ○ | ○ |
| Example 53 | 25 | 3.5 | 70 | ○ | 0 | 0.7 | ○ | ○ | ○ |
| Example 54 | 25 | 3.5 | 70 | ○ | 0 | 0.7 | ○ | ○ | ○ |
| Example 55 | 25 | 3.5 | 60 | ○ | 0 | 0.6 | ○ | ○ | ○ |
| Example 56 | 25 | 3.5 | 70 | ○ | 0 | 0.7 | ○ | ○ | ○ |
| Example 57 | 25 | 3.5 | 60 | ○ | 0 | 0.6 | ○ | ○ | ○ |
| Example 58 | 25 | 3.5 | 70 | ○ | 0 | 0.7 | ○ | ○ | ○ |
| Example 59 | 25 | 3.5 | 60 | ○ | 0 | 0.6 | ○ | ○ | ○ |
| Example 60 | 25 | 3.5 | 70 | ○ | 0 | 0.7 | ○ | ○ | ○ |

TABLE 21

|  | Density of overcoat layer [g/cm³] | Overcoat layer thickness [nm] | Initial haze [%] | Difference of haze value between before and after abrasion resistance test | Anti-fogging property against 35° C. steam [sec] | Heat resistance | | Water absorption under water absorption saturation condition per unit area of antifogging film [mg/cm²] | Acid resistance | Alkali resistance | Adhesion | Δ E [%] |
|---|---|---|---|---|---|---|---|---|---|---|---|---|
|  |  |  |  |  |  | Outward appearance | Anti-fogging property reduction [%] |  |  |  |  |  |
| Example 1 | — | — | 0.2 | 3.5 | 70 | ○ | 0 | 0.7 | ○ | ○ | ○ | 1.4 |
| Example 61 | 0.62 | 300 | 0.1 | 1.9 | 65 | ○ | 0 | 0.7 | ○ | ○ | ○ | 0.1 |
| Example 62 | 0.59 | 90 | 0.2 | 2.3 | 70 | ○ | 0 | 0.7 | ○ | ○ | ○ | 0.1 |
| Reference Example 1 | 1.12 | 300 | 0.9 | — | — | — | — | — | — | — | — | — |

The invention claimed is:

1. An antifogging film-forming material obtained by reacting, in the presence of a quaternary ammonium salt or quaternary phosphonium salt, a compound represented by the following general formula [1] with a multifunctional epoxy compound having a solubility of 40-100 mass % in 25° C. water, the antifogging film-forming material being characterized by having a weight average molecular weight of 100,000-5,000,000;

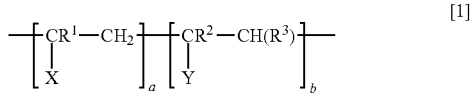

wherein $R^1$ and $R^2$ represent a hydrogen or a methyl group, and $R^3$ represents a hydrogen or a $C_1$-$C_5$ alkyl group;
wherein X represents
at least one group selected from the group consisting of —C(=O)—N($R^4$)$_2$ where $R^4$ is mutually independently a $C_1$-$C_4$ alkyl group, an amino group, a sulfonate group and hydroxyl group; or
a monovalent organic group comprising at least one group selected from the group consisting of an amide group, an amino group, a sulfonate group and hydroxyl group and an aliphatic hydrocarbon group;
wherein Y represents a carboxyl group or a group represented by —$R^5$—C(=O)—OH where $R^5$ is a divalent aliphatic hydrocarbon group or a divalent organic group comprising at least one group selected from the group consisting of an ester group, an ether group and an amide group and an aliphatic hydrocarbon group; and
wherein "a" and "b" are integers at the ratio of a:b=0.7-2.5:1.0 and wherein the order of repeating structural units is not particularly limited.

2. The antifogging film-forming material as claimed in claim 1, wherein the compound represented by the general formula [1] is a compound represented by the following general formula [2];

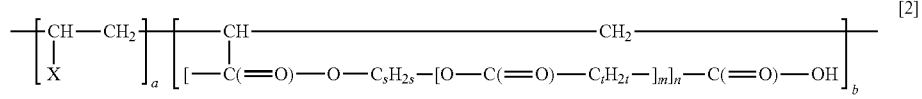

wherein "X", wherein "a" and "b" are the same as in the formula [1], wherein "m" represents an integer of 0-2, wherein "n" represents an integer of 0-3, wherein "s" represents an integer of 1-4, and wherein "t" represents an integer of 1-4 and wherein the order of repeating structural units is not particularly limited.

3. The antifogging film-forming material as claimed in claim 1, wherein the compound represented by the general formula [1] has a weight average molecular weight of 10,000-500,000.

4. The antifogging film-forming material as claimed in claim 1, wherein the multifunctional epoxy compound is an aliphatic glycidyl ether-based polyepoxide or an aliphatic glycidyl ether-based epoxide.

5. The antifogging film-forming material as claimed in claim 1, wherein the multifunctional epoxy compound has an average number of functional groups per molecule of 1.5-6.5.

6. The antifogging film-forming material as claimed in claim 1, wherein the Y in the compound represented by the general formula [1] is a carboxyl group, by reacting the multifunctional epoxy compound in an amount of epoxy group of 1-2 mol relative to 1 mol of the carboxyl group.

7. A coating liquid, comprising the antifogging film-forming material as claimed in claim 1 and a solvent.

8. The coating liquid, as claimed in claim 7, further comprising a curing agent.

9. The coating liquid, as claimed in claim 7, further comprising fine particles.

10. A method for preparing the coating liquid-as claimed in claim 7, comprising
(a) reacting the compound represented by the general formula [1] with the multifunctional epoxy compound in the solvent and in the presence of the quaternary ammonium salt or quaternary phosphonium salt; and
at least one operation selected from the group consisting of
(b) adjusting solid matter concentration and viscosity by concentrating a solution containing the antifogging film-forming material obtained in the step (a), or adding a solvent to the solution containing the antifogging film-forming material obtained in the step (a),
(c) adding the curing agent to the solution containing the antifogging film-forming material obtained in the step (a), and
(d) adding fine particles to the solution containing the-antifogging film-forming material obtained in the step (a).

11. An antifogging article comprising a base material, a primer layer formed on the surface thereof, and an antifogging film formed on the surface of the primer layer, wherein the antifogging film is obtained by applying the coating liquid as claimed in claim 7 on the surface of the primer layer and curing the coating liquid.

12. The antifogging article as claimed in claim 11, wherein haze values of the antifogging article, measured before and after carrying out an abrasion resistance test according to JIS R 3212 at a portion where the test is conducted, have a difference of not larger than 4.0.

13. The antifogging article as claimed in claim 11, wherein an antifogging property reduction, which is a value expressed by (A−B)×100/A where B is water absorption under water absorption saturation condition per unit area of the antifogging film after being exposed to 100° C. heat for 1000 hours and A is water absorption under water absorption saturation condition per unit area of the antifogging film before the exposure is 40% or less.

14. The antifogging article as claimed in claim 13, wherein the water absorption A is 0.2-5 mg/cm$^2$.

15. A method for producing the antifogging article as claimed in claim 11, comprising:
(a) forming the primer layer on the surface of the base material, wherein the primer layer comprises a silane coupling agent;
(b) applying the coating liquid onto the primer layer; and
(c) curing a coating film obtained by the step (b).

16. The method for producing the antifogging article, as claimed in claim 15, wherein the step (c) is conducted by heating the coating film obtained after the step (b) at not higher than 80° C., thereby curing the coating film.

17. The method for producing the antifogging article, as claimed in claim 15, further comprising:

(d) rinsing the surface of the antifogging film after the step (c).

18. The method for producing the antifogging article, as claimed in claim 15, further comprising:
(e) forming an overcoat layer having a density of 0.50-0.85 g/cm² on the surface of the antifogging film after the step (c) and before the step (d).

19. The antifogging article as claimed in claim 11, further comprising an overcoat layer having a density of 0.50-0.85 g/cm², on the surface of the antifogging film.

20. An antifogging article as claimed in claim 19, wherein the overcoat layer comprises a reactant of polyacrylic acids having a weight average molecular weight of 2,000-150,000 and a multifunctional epoxy compound having a solubility of 40-100 mass % in 25° C. water.

* * * * *